US010005951B2

(12) United States Patent
Vo et al.

(10) Patent No.: US 10,005,951 B2
(45) Date of Patent: Jun. 26, 2018

(54) RESIN COMPOSITION FOR TREATMENT OF A SUBTERRANEAN FORMATION

(71) Applicant: Halliburton Energy Services, Inc., Houston, TX (US)

(72) Inventors: Loan K. Vo, Houston, TX (US); Philip D. Nguyen, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 30 days.

(21) Appl. No.: 14/364,572

(22) PCT Filed: Aug. 1, 2013

(86) PCT No.: PCT/US2013/053286
§ 371 (c)(1),
(2) Date: Jun. 11, 2014

(87) PCT Pub. No.: WO2015/016934
PCT Pub. Date: Feb. 5, 2015

(65) Prior Publication Data
US 2016/0024371 A1 Jan. 28, 2016

(51) Int. Cl.
| | |
|---|---|
| *C09K 8/56* | (2006.01) |
| *E21B 43/16* | (2006.01) |
| *C09K 8/035* | (2006.01) |
| *C09K 8/42* | (2006.01) |
| *C09K 8/52* | (2006.01) |
| *C09K 8/62* | (2006.01) |
| *C09K 8/72* | (2006.01) |
| *C09K 8/80* | (2006.01) |
| *C08G 73/02* | (2006.01) |
| *C08L 79/02* | (2006.01) |

(52) U.S. Cl.
CPC ............ *C09K 8/56* (2013.01); *C08G 73/0206* (2013.01); *C08L 79/02* (2013.01); *C09K 8/035* (2013.01); *C09K 8/42* (2013.01); *C09K 8/52* (2013.01); *C09K 8/62* (2013.01); *C09K 8/72* (2013.01); *C09K 8/805* (2013.01); *E21B 43/16* (2013.01)

(58) Field of Classification Search
None
See application file for complete search history.

(56) References Cited

U.S. PATENT DOCUMENTS

| | | | |
|---|---|---|---|
| 3,766,299 A * | 10/1973 | Dornte | C08G 73/0213 525/417 |
| 4,460,627 A | 7/1984 | Weaver et al. | |
| 6,364,016 B1 | 4/2002 | Dalrymple et al. | |
| 6,476,169 B1 | 11/2002 | Eoff et al. | |
| 6,832,650 B2 | 12/2004 | Nguyen et al. | |
| 6,978,836 B2 | 12/2005 | Nguyen et al. | |
| 7,114,570 B2 | 10/2006 | Nguyen et al. | |
| 2004/0142826 A1 | 7/2004 | Nguyen et al. | |
| 2005/0274520 A1 | 12/2005 | Nguyen et al. | |
| 2006/0076138 A1 | 4/2006 | Dusterhoft et al. | |
| 2007/0131425 A1* | 6/2007 | Gatlin | C09K 8/506 166/280.2 |
| 2007/0181302 A1* | 8/2007 | Bicerano | C09K 8/68 166/280.2 |
| 2007/0193746 A1 | 8/2007 | Brannon et al. | |
| 2007/0289781 A1* | 12/2007 | Rickman | C09K 8/68 175/65 |
| 2010/0093891 A1* | 4/2010 | Li | C09K 8/5083 523/130 |

FOREIGN PATENT DOCUMENTS

| | | |
|---|---|---|
| WO | WO-2008099154 A1 | 8/2008 |
| WO | WO-2015/016934 A1 | 2/2015 |

OTHER PUBLICATIONS

"International Application Serial No. PCT/US2013/053286, International Search Report dated May 1, 2014", 3 pgs.
"International Application Serial No. PCT/US2013/053286, Written Opinion dated May 1, 2014", 7 pgs.
"International Application Serial No. PCT/US2013/053286, International Preliminary Report on Patentability dated Feb. 11, 2016", 9 pgs.
"Australian Application Serial No. 2013395658, First Examiner Report dated Apr. 13, 2016", 3 pgs.

\* cited by examiner

*Primary Examiner* — Jeffrey Washville
(74) *Attorney, Agent, or Firm* — Chamberlain Hrdlicka

(57) ABSTRACT

The present invention relates to resin compositions for treatment of a subterranean formation. In various embodiments, the present invention provides a method of treating a subterranean formation. The method can include obtaining or providing a resin composition that includes a hardenable composition including a hardenable resin. The resin composition also can include a hardening composition including a water control hardening agent. The method can include contacting a subterranean material downhole with the resin composition, and reacting the hardenable composition and the hardening composition, to give a hardened resin composition. In some embodiments, the resin composition provides both particulate consolidation and water control.

18 Claims, No Drawings

US 10,005,951 B2

RESIN COMPOSITION FOR TREATMENT OF A SUBTERRANEAN FORMATION

PRIORITY APPLICATION

This application is a U.S. National Stage Filing under 35 U.S.C. 371 from International Application No. PCT/US2013/053286, filed 1 Aug. 2013; the application is incorporated herein by reference in its entirety.

BACKGROUND OF THE INVENTION

The production of water from oil and gas wells constitutes a major problem and expense. When the hydrocarbon-producing formation in which an oil or gas well is completed contains layers of water and hydrocarbons or when there are water-producing zones near the hydrocarbon-producing formation, the higher mobility of the water often allows it to flow into the wellbore. In the production of such wells, the ratios of water to hydrocarbons recovered can become so high that the cost of producing the water, separating it from the hydrocarbons, and disposing of it represents a significant economic loss.

Hydrocarbon wells are often located in subterranean zones that contain unconsolidated particulate matter that can migrate out of the well along with oil, gas, water, or other fluids produced by the well. The presence of the particulate matter, such as sand, in the produced fluids is problematic since, for example, it can abrade pumping and other producing equipment and reduce the fluid production capabilities of the producing zones. Unconsolidated subterranean zones can include those which contain loose particulates that are readily entrained by produced fluids and those wherein the particulates making up the zone are held together with insufficient bond strength to withstand the forces produced by the production of fluids through the zones.

Downhole water control treatments to mitigate production of water and downhole treatments to consolidate particulate matter are performed as at least two separate treatments, each requiring different treatment compositions. The transportation, preparation, and application downhole of each composition is inconvenient, and requires both time and economic expenditure.

SUMMARY OF THE INVENTION

In various embodiments, the present invention provides a method of treating a subterranean formation. The method includes obtaining or providing a resin composition. The resin composition includes a hardenable composition. The hardenable composition includes a hardenable resin. The resin composition also includes a hardening composition. The hardening composition includes a water control hardening agent. The method also includes contacting a subterranean material downhole with the resin composition. The method also includes reacting the hardenable composition and the hardening composition, to give a hardened resin composition.

In various embodiments, the present invention provides certain advantages over other compositions for treatment of a subterranean formation, and methods and systems including the same, at least some of which are unexpected. For example, in some embodiments, the present invention advantageously provides a single treatment that provides both water control and particulate consolidation downhole, and can provide consolidation of produced sand and fines downhole or consolidation of proppants placed downhole. By providing both water control and particulate consolidation with a single composition, various embodiments avoid the need to perform two separate treatments to achieve both water control and consolidation.

By avoiding two separate treatments, various embodiments can provide a more efficient method of achieving water control and consolidation. In some embodiments, the transportation, preparation, and application of two separate treatment compositions can be avoided, saving time and money. In some embodiments, incompatibilities between water control treatments and consolidation or stabilization treatments can be avoided. In some embodiments, shut-in time needed by consolidation resin prior to water treatment application can be avoided. In some embodiments, water control and particulate consolidation can be achieved more quickly than with other methods. In some embodiments, water control and particulate consolidation can be achieved with less financial expenditure than with other methods. In some embodiments, the water control provided by the present composition and method can be more effective than the water control provided by other methods, such as by more effectively preventing water from being produced by the formation along with the hydrocarbons. In various embodiments, the particulate consolidation provided by the present composition and method can be more effective than the particulate consolidation provided by other compositions and methods, such as by more effectively holding together particulates produced downhole or placed downhole (e.g. proppants). In some embodiments, the water control polymer can have a more lasting and robust water control effect due to the water control hardening agent being incorporated into the polymer and thereby being more securely anchored in place and less likely to wash away as compared to other water control treatments.

In various embodiments, the present invention provides a method of treating a subterranean formation. The method includes obtaining or providing a resin composition. The resin composition includes a hardenable composition that includes a hardenable resin. The hardenable resin is about 70 wt % to about 100 wt % of the hardenable composition. The hardenable composition is about 10 wt % to about 90 wt % of the resin composition. The resin composition also includes a hardening composition that includes a water control hardening agent. The water control hardening agent is about 40 wt % to about 60 wt % of the hardening composition. The hardening composition is about 10 wt % to about 90 wt % of the resin composition. The water control hardening agent is at least one of a polymer having Structure I and a polymer having Structure II.

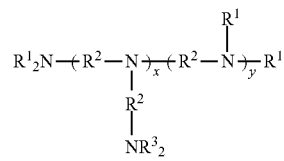

Structure I

The polymer of Structure I is a block or random copolymer wherein each repeating unit at each occurrence independently occurs in the orientation shown in Structure I or in an opposite orientation. The variable $R^1$ at each occurrence is independently selected from the group consisting of —H and $C_1$-$C_{10}$ hydrocarbyl. The variable $R^2$ at each occurrence is independently $C_1$-$C_{10}$ hydrocarbylene. The variable $R^3$ at each occurrence is independently selected from the group consisting of $R^1$ and $-R^2-NR^3{}_2$, $0 \leq x \leq 25,000$, $0 \leq y \leq 25,000$, and $2 \leq x+y \leq 25,000$.

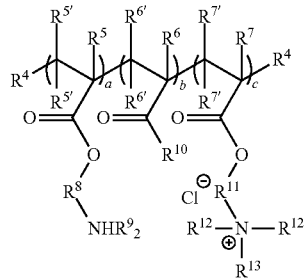

Structure II

The polymer of Structure II is a block or random copolymer wherein each repeating unit at each occurrence independently occurs in the orientation shown in Structure I or in an opposite orientation. Each of $R^4$, $R^5$, $R^{5\prime}$, $R^6$, $R^{6\prime}$, $R^7$, and $R^{7\prime}$ at each occurrence is independently selected from the group consisting of —H and $C_1$-$C_{10}$ hydrocarbyl. Each of $R^8$ and $R^{11}$ at each occurrence is independently $C_1$-$C_{10}$ hydrocarbylene. Each of $R^9$ and $R^{12}$ at each occurrence is independently selected from the group consisting of —H and $C_1$-$C_{10}$ hydrocarbyl. The variable $R^{10}$ at each occurrence is independently selected from the group consisting of —OH, —O$^-$, and —O$^-$CI$^+$ wherein CI$^+$ is a counter-ion. The variable $R^{13}$ at each occurrence is independently selected from the group consisting of —H and $C_1$-$C_{50}$ hydrocarbyl. The variable CI$^-$ is a counter-ion that is optionally present or not present. The variables a, b, and c are mole fractions, wherein a+b+c=1, $0.01 \leq a \leq 99.98$, $0.01 \leq b \leq 99.98$, and $0.01 \leq c \leq 99.98$. The method includes contacting a subterranean material downhole with the resin composition. The method also includes reacting the hardenable composition and the hardening composition, to give a hardened resin composition.

In various embodiments, the present invention provides a system. The system includes a resin composition. The resin composition includes a hardenable composition that includes a hardenable resin. The resin composition also includes a hardening composition including a water control hardening agent. The system also includes a subterranean material downhole in contact with the resin composition. The hardenable composition and the hardening composition are configured to react to give a hardened resin composition.

In various embodiments, the present invention provides a composition for treatment of a subterranean formation. The composition includes a hardenable composition including a hardenable resin. The composition also includes a hardening composition. The hardening composition includes a water control hardening agent. The water control hardening agent is at least one of a polymer having Structure I or a polymer having Structure II.

Structure I

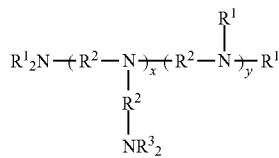

The polymer of Structure I is a block or random copolymer wherein each repeating unit at each occurrence independently occurs in the orientation shown in Structure I or in an opposite orientation. The variable $R^1$ at each occurrence is independently selected from the group consisting of —H and $C_1$-$C_{10}$ hydrocarbyl. The variable $R^2$ at each occurrence is independently $C_1$-$C_{10}$ hydrocarbylene. The variable $R^3$ at each occurrence is independently selected from the group consisting of $R^1$ and $-R^2-NR^3{}_2$. In Structure I, $0 \leq x \leq 25,000$, $0 \leq y \leq 25,000$, and $2 \leq x+y \leq 25,000$.

Structure II

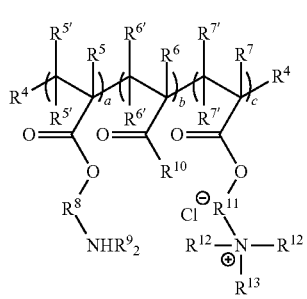

The polymer of Structure II is a block or random copolymer wherein each repeating unit at each occurrence independently occurs in the orientation shown in Structure I or in an opposite orientation. Each of $R^4$, $R^5$, $R^{5\prime}$, $R^6$, $R^{6\prime}$, $R^7$, and $R^{7\prime}$ at each occurrence is independently selected from the group consisting of —H and $C_1$-$C_{10}$ hydrocarbyl. Each of $R^8$ and $R^{11}$ at each occurrence is independently $C_1$-$C_{10}$ hydrocarbylene. Each of $R^9$ and $R^{12}$ at each occurrence is independently selected from the group consisting of —H and $C_1$-$C_{10}$ hydrocarbyl. The variable $R^{10}$ at each occurrence is independently selected from the group consisting of —OH, —O$^-$, and —O$^-$CI$^+$ wherein CI$^+$ is a counter-ion. The variable $R^{13}$ at each occurrence is independently selected from the group consisting of —H and $C_1$-$C_{50}$ hydrocarbyl. The variable CI$^-$ is a counter-ion that is optionally present or not present. The variables a, b, and c are mole fractions, wherein a+b+c=1, $0.01 \leq a \leq 99.98$, $0.01 \leq b \leq 99.98$, and $0.01 \leq c \leq 99.98$.

In various embodiments, the present invention provides a composition for treatment of a subterranean formation. The composition includes a hardenable composition that includes a hardenable resin. The composition also includes a hardening composition including a water control hardening agent. The water control hardening agent can be a polymer having the structure

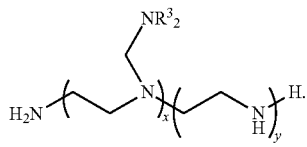

The variable $R^3$ at each occurrence is independently selected from the group consisting of —H and —CH$_2$—CH$_2$—NR$^3{}_2$, $0 \leq x \leq 2,500$, $0 \leq y \leq 2,500$, $10 \leq x+y \leq 2,500$, and the molecular weight of the polymer is about 300 g/mol to about 200,000 g/mol. Alternatively or in addition, the water control hardening agent can be a polymer having the structure

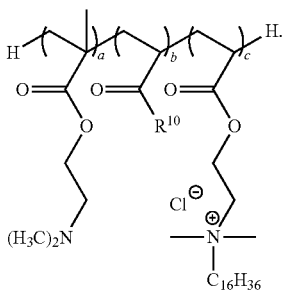

The variables a, b, and c are mole fractions, a is about 0.9, b is about 0.05, c is about 0.05, $R^{10}$ at each occurrence is independently selected from the group consisting of —OH, —O⁻, and —O⁻Cl⁺ wherein Cl⁺ is a counter-ion, and Cl⁻ is a counter-ion that is optionally present or not present. For both structures, the water control hardening agent polymer is a block or random copolymer, each repeating unit at each occurrence independently occurring in the orientation shown, or in an opposite orientation.

In various embodiments, the present invention provides a method of preparing a composition for treatment of a subterranean formation. The method includes forming a composition including a hardenable composition including a hardenable resin. The composition also includes a hardening composition including a water control hardening agent. The water control hardening agent is at least one of a polymer having Structure I and a polymer having Structure II.

Structure I

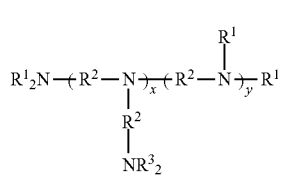

The polymer of Structure I is a block or random copolymer wherein each repeating unit at each occurrence independently occurs in the orientation shown in Structure I or in an opposite orientation. The variable $R^1$ at each occurrence is independently selected from the group consisting of —H and $C_1$-$C_{10}$ hydrocarbyl. The variable $R^2$ at each occurrence is independently $C_1$-$C_{10}$ hydrocarbylene. The variable $R^3$ at each occurrence is independently selected from the group consisting of $R^1$ and —$R^2$—$NR^3_2$. In Structure I, $0 \leq x \leq 25,000$, $0 \leq y \leq 25,000$, and $2 \leq x+y \leq 25,000$.

Structure II

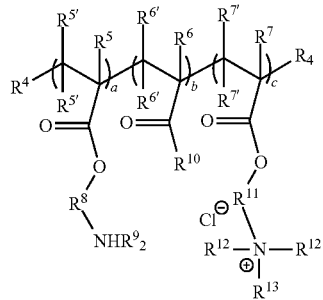

The polymer of Structure II is a block or random copolymer wherein each repeating unit at each occurrence independently occurs in the orientation shown in Structure I or in an opposite orientation. Each of $R^4$, $R^5$, $R^{5'}$, $R^6$, $R^{6'}$, $R^7$, and $R^{7'}$ at each occurrence is independently selected from the group consisting of —H and $C_1$-$C_{10}$ hydrocarbyl. Each of $R^8$ and $R^{11}$ at each occurrence is independently $C_1$-$C_{10}$ hydrocarbylene. Each of $R^9$ and $R^{12}$ at each occurrence is independently selected from the group consisting of —H and $C_1$-$C_{10}$ hydrocarbyl. The variable $R^{10}$ at each occurrence is independently selected from the group consisting of —OH, —O⁻, and —O⁻Cl⁺ wherein Cl⁺ is a counter-ion. The variable $R^{13}$ at each occurrence is independently selected from the group consisting of —H and $C_1$-$C_{50}$ hydrocarbyl. The variable Cl⁻ is a counter-ion that is optionally present or not present. The variables a, b, and c are mole fractions, wherein a+b+c=1, $0.01 \leq a \leq 99.98$, $0.01 \leq b \leq 99.98$, and $0.01 \leq c \leq 99.98$.

DETAILED DESCRIPTION OF THE INVENTION

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods of manufacturing described herein, the steps can be carried out in any order without departing from the principles of the invention, except when a temporal or operational sequence is explicitly recited. Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "organic group" as used herein refers to but is not limited to any carbon-containing functional group. For example, an oxygen-containing group such as alkoxy groups, aryloxy groups, aralkyloxy groups, oxo(carbonyl) groups, carboxyl groups including carboxylic acids, carboxylates, and carboxylate esters; a sulfur-containing group such as alkyl and aryl sulfide groups; and other heteroatom-containing groups. Non-limiting examples of organic groups include OR, OOR, OC(O)N(R)$_2$, CN, CF$_3$, OCF$_3$, R, C(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S) N(R)$_2$, (CH$_2$)$_{0-2}$N(R)C(O)R, (CH$_2$)$_{0-2}$N(R)N(R)$_2$, N(R)N (R)C(O)R, N(R)N(R)C(O)OR, N(R)N(R)CON(R)$_2$, N(R) SO$_2$R, N(R)SO$_2$N(R)$_2$, N(R)C(O)OR, N(R)C(O)R, N(R)C (S)R, N(R)C(O)N(R)$_2$, N(R)C(S)N(R)$_2$, N(COR)COR, N(OR)R, C(=NH)N(R)$_2$, C(O)N(OR)R, or C(=NOR)R wherein R can be hydrogen (in examples that include other carbon atoms) or a carbon-based moiety, and wherein the carbon-based moiety can itself be further substituted.

The term "substituted" as used herein refers to an organic group as defined herein or molecule in which one or more hydrogen atoms contained therein are replaced by one or more non-hydrogen atoms. The term "functional group" or "substituent" as used herein refers to a group that can be or is substituted onto a molecule, or onto an organic group. Examples of substituents or functional groups include, but are not limited to, a halogen (e.g., F, Cl, Br, and I); an oxygen atom in groups such as hydroxyl groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxylamines, nitriles, nitro groups, N-oxides, hydrazides, azides, and enamines; and other heteroatoms in various other groups. Non-limiting examples of substituents J that can be bonded to a substituted carbon (or other) atom include F, Cl, Br, I, OR, OC(O)N(R')$_2$, CN, NO, NO$_2$, ONO$_2$, azido, CF$_3$, OCF$_3$, R', O (oxo), S (thiono), C(O), S(O), methylenedioxy, ethylenedioxy, N(R)$_2$, SR, SOR, SO$_2$R', SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N (R)C(O)R, (CH$_2$)$_{0-2}$N(R)N(R)$_2$, N(R)N(R)C(O)R, N(R)N (R)C(O)OR, N(R)N(R)CON(R)$_2$, N(R)SO$_2$R, N(R)SO$_2$N (R)$_2$, N(R)C(O)OR, N(R)C(O)R, N(R)C(S)R, N(R)C(O)N (R)$_2$, N(R)C(S)N(R)$_2$, N(COR)COR, N(OR)R, C(=NH)N (R)$_2$, C(O)N(OR)R, or C(=NOR)R wherein R can be hydrogen or a carbon-based moiety, and wherein the carbon-based moiety can itself be further substituted; for example, wherein R can be hydrogen, alkyl, acyl, cycloalkyl, aryl, aralkyl, heterocyclyl, heteroaryl, or heteroarylalkyl, wherein any alkyl, acyl, cycloalkyl, aryl, aralkyl, heterocyclyl, heteroaryl, or heteroarylalkyl or R can be independently mono- or multi-substituted with J; or wherein two R groups bonded to a nitrogen atom or to adjacent nitrogen atoms can together with the nitrogen atom or atoms form a heterocyclyl, which can be mono- or independently multi-substituted with J.

As used herein, the term "hydrocarbyl" refers to a functional group derived from a straight chain, branched, or cyclic hydrocarbon, such as an alkyl, alkenyl, alkynyl, aryl, cycloalkyl, acyl, or a combination thereof.

As used herein, the term "hydrocarbylene" refers to a divalent functional group derived from a straight chain, branched, or cyclic hydrocarbon, such as an alkylene, alkenylene, alkynylene, arylene, cycloalkylene, divalent acyl, or a combination thereof.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbons or, in some embodiments, from 2 to 8 carbon atoms. Examples include, but are not limited to vinyl, —CH=CH (CH$_3$), —CH=C(CH$_3$)$_2$, —C(CH$_3$)=CH$_2$, —C(CH$_3$) =CH(CH$_3$), —C(CH$_2$CH$_3$)=CH$_2$, cyclohexenyl, cyclopentenyl, cyclohexadienyl, butadienyl, pentadienyl, and hexadienyl among others.

The term "alkynyl" as used herein refers to straight and branched chain alkyl groups, except that at least one triple bond exists between two carbon atoms. Thus, alkynyl groups have from 2 to 40 carbon atoms, 2 to about 20 carbon atoms, or from 2 to 12 carbons or, in some embodiments, from 2 to 8 carbon atoms. Examples include, but are not limited to —C≡CH, —C≡C(CH$_3$), —C≡C(CH$_2$CH$_3$), —CH$_2$C≡CH, —CH$_2$C≡C(CH$_3$), and —CH$_2$C≡C(CH$_2$CH$_3$) among others.

The term "acyl" as used herein refers to a group containing a carbonyl moiety wherein the group is bonded via the carbonyl carbon atom. The carbonyl carbon atom is also bonded to another carbon atom, which can be part of an alkyl, aryl, aralkyl cycloalkyl, cycloalkylalkyl, heterocyclyl, heterocyclylalkyl, heteroaryl, heteroarylalkyl group or the like. In the special case wherein the carbonyl carbon atom is bonded to a hydrogen, the group is a "formyl" group, an acyl group as the term is defined herein. An acyl group can include 0 to about 12-20 or 12-40 additional carbon atoms bonded to the carbonyl group. An acyl group can include double or triple bonds within the meaning herein. An acryloyl group is an example of an acyl group. An acyl group can also include heteroatoms within the meaning here. A nicotinoyl group (pyridyl-3-carbonyl) group is an example of an acyl group within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "cycloalkyl" as used herein refers to cyclic alkyl groups such as, but not limited to, cyclopropyl, cyclobutyl, cyclopentyl, cyclohexyl, cycloheptyl, and cyclooctyl groups. In some embodiments, the cycloalkyl group can have 3 to about 8-12 ring members, whereas in other embodiments the number of ring carbon atoms range from 3 to 4, 5, 6, or 7. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined herein. Representative substituted cycloalkyl groups can be mono-substituted or substituted more than once, such as, but not limited to, 2,2-, 2,3-, 2,4-2,5- or 2,6-disubstituted cyclohexyl groups or mono-, di- or tri-substituted norbornyl or cycloheptyl groups, which can be substituted with, for example, amino, hydroxy, cyano, carboxy, nitro, thio, alkoxy, and halogen groups. The term "cycloalkenyl" alone or in combination denotes a cyclic alkenyl group.

The term "aryl" as used herein refers to cyclic aromatic hydrocarbons that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, 2-, 3-, 4-, 5-, or 6-substituted phenyl or 2-8 substituted naphthyl groups, which can be substituted with carbon or non-carbon groups such as those listed herein.

The term "aralkyl" as used herein refers to alkyl groups as defined herein in which a hydrogen or carbon bond of an alkyl group is replaced with a bond to an aryl group as defined herein. Representative aralkyl groups include benzyl and phenylethyl groups and fused (cycloalkylaryl)alkyl groups such as 4-ethyl-indanyl. Aralkenyl group are alkenyl groups as defined herein in which a hydrogen or carbon bond of an alkyl group is replaced with a bond to an aryl group as defined herein.

The term "heterocyclyl" as used herein refers to aromatic and non-aromatic ring compounds containing 3 or more ring members, of which, one or more is a heteroatom such as, but not limited to, N, O, and S. Thus a heterocyclyl can be a cycloheteroalkyl, or a heteroaryl, or if polycyclic, any combination thereof. In some embodiments, heterocyclyl groups include 3 to about 20 ring members, whereas other such groups have 3 to about 15 ring members. A heterocyclyl group designated as a $C_2$-heterocyclyl can be a 5-ring with two carbon atoms and three heteroatoms, a 6-ring with two carbon atoms and four heteroatoms and so forth. Likewise a $C_4$-heterocyclyl can be a 5-ring with one heteroatom, a 6-ring with two heteroatoms, and so forth. The number of carbon atoms plus the number of heteroatoms sums up to equal the total number of ring atoms. A heterocyclyl ring can also include one or more double bonds. A heteroaryl ring is an embodiment of a heterocyclyl group. The phrase "heterocyclyl group" includes fused ring species including those that include fused aromatic and non-aromatic groups.

The term "heterocyclylalkyl" as used herein refers to alkyl groups as defined herein in which a hydrogen or carbon bond of an alkyl group as defined herein is replaced with a bond to a heterocyclyl group as defined herein. Representative heterocyclyl alkyl groups include, but are not limited to, furan-2-yl methyl, furan-3-yl methyl, pyridine-3-yl methyl, tetrahydrofuran-2-yl ethyl, and indol-2-yl propyl.

The term "heteroarylalkyl" as used herein refers to alkyl groups as defined herein in which a hydrogen or carbon bond of an alkyl group is replaced with a bond to a heteroaryl group as defined herein.

The term "alkoxy" as used herein refers to an oxygen atom connected to an alkyl group, including a cycloalkyl group, as are defined herein. Examples of linear alkoxy groups include but are not limited to methoxy, ethoxy, propoxy, butoxy, pentyloxy, hexyloxy, and the like. Examples of branched alkoxy include but are not limited to isopropoxy, sec-butoxy, tert-butoxy, isopentyloxy, isohexyloxy, and the like. Examples of cyclic alkoxy include but are not limited to cyclopropyloxy, cyclobutyloxy, cyclopentyloxy, cyclohexyloxy, and the like. An alkoxy group can include one to about 12-20 or about 12-40 carbon atoms bonded to the oxygen atom, and can further include double or triple bonds, and can also include heteroatoms. For example, an allyloxy group is an alkoxy group within the meaning herein. A methoxyethoxy group is also an alkoxy group within the meaning herein, as is a methylenedioxy group in a context where two adjacent atoms of a structures are substituted therewith.

The term "amine" as used herein refers to primary, secondary, and tertiary amines having, e.g., the formula N(group)$_3$ wherein each group can independently be H or non-H, such as alkyl, aryl, and the like Amines include but are not limited to R-NH$_2$, for example, alkylamines, arylamines, alkylarylamines; R$_2$NH wherein each R is independently selected, such as dialkylamines, diarylamines, aralkylamines, heterocyclylamines and the like; and R$_3$N wherein each R is independently selected, such as trialkylamines, dialkylarylamines, alkyldiarylamines, triarylamines, and the like. The term "amine" also includes ammonium ions as used herein.

The term "amino group" as used herein refers to a substituent of the form —NH$_2$, —NHR, —NR$_2$, —NR$_3^+$, wherein each R is independently selected, and protonated forms of each, except for —NR$_3^+$, which cannot be protonated. Accordingly, any compound substituted with an amino group can be viewed as an amine An "amino group" within the meaning herein can be a primary, secondary, tertiary or quaternary amino group. An "alkylamino" group includes a monoalkylamino, dialkylamino, and trialkylamino group.

The terms "halo" or "halogen" or "halide", as used herein, by themselves or as part of another substituent mean, unless otherwise stated, a fluorine, chlorine, bromine, or iodine atom, preferably, fluorine, chlorine, or bromine.

The term "haloalkyl" group, as used herein, includes mono-halo alkyl groups, poly-halo alkyl groups wherein all halo atoms can be the same or different, and per-halo alkyl groups, wherein all hydrogen atoms are replaced by halogen atoms, such as fluoro. Examples of haloalkyl include trifluoromethyl, 1,1-dichloroethyl, 1,2-dichloroethyl, 1,3-dibromo-3,3-difluoropropyl, perfluorobutyl, and the like.

The term "hydrocarbon" as used herein refers to a functional group or molecule that includes carbon and hydrogen atoms. The term can also refer to a functional group or molecule that normally includes both carbon and hydrogen atoms but wherein all the hydrogen atoms are substituted with other functional groups.

The term "number-average molecular weight" as used herein refers to the ordinary arithmetic mean of the molecular weight of individual molecules in a sample. It is defined as the total weight of all molecules in a sample divided by the total number of molecules in the sample. Experimentally, the number average molecular weight ($M_n$) is determined by analyzing a sample divided into molecular weight fractions of species i having $n_i$ molecules of molecular weight $M_i$ through the formula $M_n = \Sigma M_i n_i / \Sigma n_i$. The number average molecular weight can be measured by a variety of well-known methods including gel permeation chromatography, spectroscopic end group analysis and osmometry. If unspecified, molecular weights of polymers given herein are number-average molecular weights.

The term "weight-average molecular weight" as used herein refers ($M_w$), which is equal to $\Sigma M_i^2 n_i / \Sigma M_i n_i$, where $n_i$ is the number of molecules of molecular weight $M_i$. In various examples, the weight average molecular weight can be determined using light scattering, small angle neutron scattering, X-ray scattering, and sedimentation velocity.

The term "solvent" as used herein refers to a liquid that can dissolve a solid, liquid, or gas. Nonlimiting examples of solvents are silicones, organic compounds, water, alcohols, ionic liquids, and supercritical fluids.

The term "room temperature" as used herein refers to a temperature of about 15° C. to 28° C.

As used herein, "degree of polymerization" is the number of repeating units in a polymer.

Selected substituents within the compounds described herein are present to a recursive degree. In this context, "recursive substituent" means that a substituent may recite another instance of itself or of another substituent that itself recites the first substituent. Recursive substituents are an intended aspect of the disclosed subject matter. Because of the recursive nature of such substituents, theoretically, a large number may be present in any given claim. One of ordinary skill in the art of organic chemistry understands that the total number of such substituents is reasonably limited by the desired properties of the compound intended. Such properties include, by way of example and not limitation, physical properties such as molecular weight, solubility, and practical properties such as ease of synthesis. Recursive substituents can call back on themselves any suitable number of times, such as about 1 time, about 2 times, 3, 4, 5, 6, 7, 8, 9, 10, 15, 20, 30, 50, 100, 200, 300, 400, 500, 750, 1000, 1500, 2000, 3000, 4000, 5000, 10,000, 15,000, 20,000, 30,000, 50,000, 100,000, 200,000, 500,000, 750,000, or about 1,000,000 times or more.

As used herein, the term "polymer" refers to a molecule having at least one repeating unit, and can include copolymers.

The term "copolymer" as used herein refers to a polymer that includes at least two different monomers. A copolymer can include any suitable number of monomers.

The term "downhole" as used herein refers to under the surface of the earth, such as a location within or fluidly connected to a wellbore.

As used herein, the term "drilling fluid" refers to fluids, slurries, or muds used in drilling operations downhole, such as the formation of the wellbore.

As used herein, the term "stimulation fluid" refers to fluids or slurries used downhole during stimulation activities of the well that can increase the production of a well, including perforation activities. In some examples, a stimulation fluid can include a fracturing fluid, or an acidizing fluid.

As used herein, the term "clean-up fluid" refers to fluids or slurries used downhole during clean-up activities of the well, such as any treatment to remove material obstructing the flow of desired material from the subterranean formation. In one example, a clean-up fluid can be an acidification treatment to remove material formed by one or more perforation treatments. In another example, a clean-up fluid can be used to remove a filter cake.

As used herein, the term "fracturing fluid" refers to fluids or slurries used downhole during fracturing operations.

As used herein, the term "spotting fluid" refers to fluids or slurries used downhole during spotting operations, and can be any fluid designed for localized treatment of a downhole region. In one example, a spotting fluid can include a lost circulation material for treatment of a specific section of the wellbore, such as to seal off fractures in the wellbore and prevent sag. In another example, a spotting fluid can include a water control material. In some examples, a spotting fluid can be designed to free a stuck piece of drilling or extraction equipment, can reduce torque and drag with drilling lubricants, prevent differential sticking, promote wellbore stability, and can help to control mud weight.

As used herein, the term "production fluid" refers to fluids or slurries used downhole during the production phase of a well. Production fluids can include downhole treatments designed to maintain or increase the production rate of a well, such as perforation treatments, clean-up treatments, or remedial treatments.

As used herein, the term "completion fluid" refers to fluids or slurries used downhole during the completion phase of a well, including cementing compositions.

As used herein, the term "remedial treatment fluid" refers to fluids or slurries used downhole for remedial treatment of a well. Remedial treatments can include treatments designed to increase or maintain the production rate of a well, such as stimulation or clean-up treatments.

As used herein, the term "abandonment fluid" refers to fluids or slurries used downhole during or preceding the abandonment phase of a well.

As used herein, the term "acidizing fluid" refers to fluids or slurries used downhole during acidizing treatments downhole. In one example, an acidizing fluid is used in a clean-up operation to remove material obstructing the flow of desired material, such as material formed during a perforation operation. In some examples, an acidizing fluid can be used for damage removal.

As used herein, the term "cementing fluid" refers to fluids or slurries used during cementing operations of a well. For example, a cementing fluid can include an aqueous mixture including at least one of cement and cement kiln dust. In another example, a cementing fluid can include a curable resinous material such as a polymer that is in an at least partially uncured state.

As used herein, the term "water control material" refers to a solid or liquid material that interacts with aqueous material downhole, such that hydrophobic material can more easily travel to the surface and such that hydrophilic material (including water) can less easily travel to the surface. A water control material can be used to treat a well to cause the proportion of water produced to decrease and to cause the proportion of hydrocarbons produced to increase, such as by selectively binding together material between water-producing subterranean formations and the wellbore while still allowing hydrocarbon-producing formations to maintain output.

As used herein, the term "packing fluid" refers to fluids or slurries that can be placed in the annular region of a well between tubing and outer casing above a packer. In various examples, the packer fluid can provide hydrostatic pressure in order to lower differential pressure across the sealing element, lower differential pressure on the wellbore and casing to prevent collapse, and protect metals and elastomers from corrosion.

As used herein, the term "fluid" refers to liquids and gels, unless otherwise indicated.

As used herein, the term "subterranean material" or "subterranean formation" refers to any material under the surface of the earth, including under the surface of the bottom of the ocean. For example, a subterranean material can be any section of a wellbore and any section of an underground formation in fluid contact with the wellbore, including any materials placed into the wellbore such as cement, drill shafts, liners, tubing, or screens. In some examples, a subterranean material can be any below-ground area that can produce liquid or gaseous petroleum materials, water, or any section below-ground in fluid contact therewith.

As used herein, the term "proppant" refers to any suitable proppant material. In some examples, the proppant can be sand, bauxite, ceramic materials, glass materials, polymer materials, tetrafluoroethylene materials (e.g., "TEFLON™," and available from DuPont), nut shell materials, seed shell materials, fruit pit materials, processed wood, composite particulates prepared from a binder and fine grade particulates such as silica, alumina, fumed silica, carbon black, graphite, mica, titanium dioxide, meta-silicate, calcium silicate, kaolin, talc, zirconia, boron, fly ash, hollow glass microspheres, and solid glass, or mixtures thereof. In some examples, the particulate material used can have a particle size in the range of from about 2 to about 400 mesh, U.S. Sieve Series. In some examples, the particulate material is graded sand having a particle size in the range of from about 10 to about 70 mesh, U.S. Sieve Series. In some examples, sand particle size distribution ranges are one or more of 10-20 mesh, 20-40 mesh, 40-60 mesh or 50-70 mesh, depending on the particle size and distribution of the formation particulates to be screened out by the particulate materials. The term "particulate," as used herein, includes all known shapes of materials including substantially spherical materials, fibrous materials, polygonal materials (such as cubic materials) and mixtures thereof. A proppant can have any suitable shape such as substantially spherical materials, fibrous materials, polygonal materials (such as cubic materials) and mixtures thereof.

Method of Treating a Subterranean Formation.

In various embodiments, the present invention provides a method of treating a subterranean formation. The method can include obtaining or providing a resin composition including a hardenable composition that includes a hardenable resin. The resin composition also includes a hardening composition including a water control hardening agent. In various embodiments, obtaining or providing the resin composition includes mixing the hardenable composition and the hardening composition to provide a substantially homogenous mixture. The method can include contacting a subterranean material downhole with the resin composition. The method can also include reacting the hardenable composition and the hardening composition, to give a hardened resin composition.

In some embodiments, the method is a method of water control. In some examples, the method is a method of hydraulic fracturing. The contacting of the composition and the subterranean material can include fracturing at least part of the subterranean material to form at least one subterranean fracture. The contacted subterranean material downhole can include a fracture. In some embodiments, the hardened resin composition can include a consolidated permeable proppant pack sufficient to at least partially control proppant flowback and wherein the hardened resin composition is sufficient to at least partially mitigate the production of water. In some embodiments, the hardened resin composition be used to treat near-wellbore formations, and can be used for near-wellbore treatment while drilling a production interval (e.g., for consolidating or stabilizing the formation sand surrounding the wellbore while also mitigating the water production during production of hydrocarbons). In some embodiments, the method of treating a subterranean formation can be a method of applying remedial gravel or proppant treatments.

The obtaining or providing of the composition can occur above the surface, downhole, or any combination thereof. The reacting of the hardenable composition and the hardening composition can occur downhole, or a combination of downhole and above the surface. In some embodiments, the hardenable composition and the hardening composition can react to some extent at least one of above the surface and en route to a desired downhole location but the majority of the reacting can occur downhole at or near a desired downhole location, such as at or near a fracture.

The contacted subterranean material can be any suitable subterranean material, such as a subterranean formation in an area surrounding a wellbore. The contacted subterranean material can be at least one of a fracture and at least a part of an area surrounding a fracture. In various embodiments, contacting of the resin composition and the subterranean material is sufficient to saturate at least part of an area surrounding the wellbore to at least a depth of about 0.1 foot to about 20 feet, 0.5 foot to about 10 feet, 0.5 foot to about 6 feet, about 1 foot to about 3 feet, about 0.1 inches to about 6 inches, or about 0.25 inches to about 2 inches.

The method can include contacting the resin composition with a suitable particulate material, for example, a proppant, sand, gravel, or fines. The resin composition can be contacted with a particulate material above the surface (e.g., proppants), en route to a desired downhole location, at a desired downhole location (e.g., sand, fines, or proppant located at or near the desired downhole location before the resin composition reaches the proximity of the desired downhole location), or a combination thereof. In some embodiments, contacting the subterranean material downhole with the resin composition can include contacting the resin composition with downhole particulates. The downhole particulates can include at least one of fines, sand, gravel, and proppant.

In some embodiments, the method can include, prior to contacting the subterranean material downhole with the resin composition, mixing the resin composition with a particulate substrate to give a resin composition-particulate mixture. Contacting the subterranean material with the resin composition can include contacting the subterranean material with the resin composition-particulate mixture. The particulate substrate can include at least one of sand, bauxite, ceramic materials, glass materials, polymer materials, tetrafluoroethylene materials, nut shell materials, seed shell materials, fruit pit materials, wood, processed wood, hollow glass microspheres, and solid glass, and composite particulates prepared from a binder and at least one of silica, alumina, fumed silica, carbon black, graphite, mica, titanium dioxide, meta-silicate, calcium silicate, kaolin, talc, zirconia, boron, and fly ash. The particulate substrate can include at least one of proppant and gravel. The particulate substrate can be any suitable proportion of the resin composition-particulate mixture. For example, the particulate substrate can be about 80 wt % to about 99.999 wt % of the resin composition-particulate mixture, or about 90 to about 99 wt % of the resin composition-particulate mixture, or about 80 wt % or less, or about 85, 90, 95, 96, 97, 98, 99, 99.5, 99.9, 99.95, 99.99, 99.995, or about 99.999 wt % or more of the resin composition-particulate mixture. For example, the volume of the resin composition to the volume of the particulate substrate can be about 0.01% v/w to 10% v/w, or about 0.1% v/w to 5% v/w, or about 0.01% v/w or less, or about 0.05% v/w, 0.1, 0.5, 1, 1.5, 2, 2.5, 3, 3.5, 4, 4.5, 5, 6, 7, 8, 9, or about 10% v/w or more.

In some embodiments, the mixing of the resin composition with a particulate substrate includes mixing of the resin composition with a particulate substrate in a fracturing carrier fluid, wherein the resin composition-particulate mixture includes a resin-coated particulate substrate. In some embodiments, the mixing of the resin composition with a particulate substrate includes mixing of the resin composition with a particulate substrate to provide a resin-coated particulate substrate, further including adding and mixing the resin-coated particulate substrate with a fracturing carrier fluid. In some embodiments, the method includes at least one of a) the mixing of the resin composition with the particulate substrate includes coating the resin composition on the particulate substrate to give a resin composition-coated particulate substrate; and mixing the resin composition-coated particulate substrate with a fracturing carrier fluid, to give a first particulate slurry; and b) the mixing of the resin composition with the particulate substrate includes mixing the resin composition, the particulate substrate, and a fracturing carrier fluid, to give a second particulate slurry. The contacting of the subterranean material downhole with the resin composition can include contacting the subterranean material downhole with at least one of the first or second particulate slurry.

The resin composition can have any suitable viscosity. For example, at standard temperature and pressure the resin composition can have a viscosity of about 0.01 cP to about 10,000 cP, about 1 cP to about 1000 cP, or about 10 cP to about 100 cP, or about 0.01 cP or less, or about 0.1 cP, 1 cP, 5 cP, 10 cP, 15 cP, 20 cP, 50 cP, 100 cP, 200 cP, 500 cP, 1000 cP, 5000 cP, or about 10,000 cP or more. During contacting with the subterranean formation the resin composition can have any suitable viscosity, for example, 0.01 cP to about 10,000 cP, about 1 cP to about 1000 cP, or about 10 cP to about 100 cP, or about 0.01 cP or less, or about 0.1 cP, 1 cP, 5 cP, 10 cP, 15 cP, 20 cP, 50 cP, 100 cP, 200 cP, 500 cP, 1000 cP, 5000 cP, or about 10,000 cP or more. In some embodiments, when coating the resin composition on a particulate substrate, such as a proppant or other suitable particulate substrate, at standard temperature and pressure or under downhole conditions the resin composition can have any suitable viscosity, for example, about 0.5 cP to about 1,500 cP, about 10 cP to about 1000 cP, or about 100 cP to about 500 cP, or about 0.5 cP or less, or about 1 cP, 5 cP, 10 cP, 15 cP, 20 cP, 50 cP, 100 cP, 200 cP, 500 cP, 1000 cP, about 1,250 cP, or about 1,500 cP or more. In some embodiments, when pumping the resin composition downhole, at standard temperature and pressure or under downhole conditions the resin composition can have any suitable viscosity, for example, 0.05 cP to about 100 cP, about 1 cP to about 50 cP, or about 5 cP to about 25 cP, or about 0.05 cP or less, or about 0.1 cP, 0.5 cP, 1 cP, 5 cP, 10 cP, 15 cP, 20 cP, 25 cP, 30 cP, 40 cP, 50 cP, 60 cP, 70 cP, 75 cP, 80 cP, 85 cP, 90 cP, about 95 cP, or about 100 cP or more. As the resin composition cures and hardens, the viscosity can increase as a function of time. In some embodiments, the hardened resin composition has a viscosity downhole, for example at the location wherein the resin composition and the subterranean material are contacted, of at least about 10 cP, 50 cP, or at least about 100 cP to about 1,000,000,000 cP (e.g. the hardened composition have essentially infinite viscosity), or about 10 cP to 500,000,000 cP or more (e.g., the composition can be a gel having essentially infinite viscosity), 10 cP to about 100,000,000, or about 10 cP to about 1,000,000, or about 10 cP or less, or about 15 cP, 20 cP, 50 cP, 100 cP, 200 cP, 500 cP, 1000 cP, 5000 cP, 10,000 cP, 50,000 cP, 100,000 cP, 500,000 cP, 1,000,000 cP, 10,000,000 cP, 100,000,000 cP, or about 500,000,000 cP or more.

In some embodiments, the method includes applying a preflush solution to the subterranean formation. For example, the preflush solution can ready the subterranean material to receive the resin composition and can remove oils that can impede the resin composition from making contact with particulates that are desired to be consolidated by the hardened resin composition. The preflush solution can include an aqueous liquid. The aqueous liquid in the preflush can be at least one of salt water and brine, and can include any component that does not react adversely with other materials used in embodiments of the present invention. The preflush solution can include a surfactant, such as any surfactant described herein. In some examples, the surfactant can be at least one of an ethoxylated nonyl phenol phosphate ester, a cationic surfactant, a non-ionic surfactant, an alkyl phosphonate surfactant, or mixtures thereof.

In some embodiments, the method can include applying an afterflush fluid to the subterranean formation. For example, the afterflush fluid can displace the resin composition from selected areas of the the wellbore to remove the resin composition from the pore spaces inside the subterranean formation and thereby restore permeability while leaving behind resin composition at, for example, contact points between the subterranean formation and particulates such that the particulates can be consolidated. The afterflush fluid can include at least one of salt water and brine. In some examples, the afterflush fluid can include nitrogen gas. The afterflush fluid can include any suitable component that does not react adversely with other materials used in embodiments of the present invention.

In some embodiments, the resin composition includes a carrier fluid. The resin fluid can be any suitable carrier fluid. The carrier fluid can be part of the hardenable composition, the hardening composition, or a combination thereof. The carrier fluid can be any suitable carrier fluid. For example, the carrier fluid can be at least one of an aqueous liquid and an organic liquid such as an organic solvent. The carrier fluid can be at least one of dipropylene glycol methyl ether, dipropylene glycol dimethyl ether, dimethyl formamide, diethylene glycol methyl ether, ethylene glycol butyl ether, diethylene glycol butyl ether, propylene carbonate, D-limonene, a $C_2$-$C_{40}$ fatty acid $C_1$-$C_{10}$ alkyl ester, 2-butoxy ethanol, butyl acetate, furfuryl acetate, dimethyl sulfoxide, and dimethyl formamide. The carrier fluid can be any suitable proportion of the hardenable composition. In some embodiments, the carrier fluid can be about 0 wt % to about 80 wt % or the hardenable composition, about 0 wt % to about 60 wt % of the hardenable composition, or about 0 wt % to about 30 wt % of the hardenable composition, or about 0 wt %, 5, 10, 15, 20, 25, 30, 35, 40, 45, 50, 55, 60, 65, 70, 75, or about 80 wt % or more of the hardenable composition. The carrier fluid can be any suitable proportion of the hardening composition. In some embodiments, the hardening composition includes about 0 wt % to about 80 wt % of the carrier fluid, about 0 wt % to about 60 wt %, or about 0 wt % to about 30 wt % of the carrier fluid, or about 0 wt %, 5, 10, 15, 20, 25, 30, 35, 40, 45, 50, 55, 60, 65, 70, 75, or about 80 wt % or more of the hardening composition. The carrier fluid can be any suitable proportion of the resin composition. In some embodiments, the carrier fluid can be about 0.01 wt % to about 99.99 wt % of the resin composition, or about 10 wt % to about 95 wt % of the resin composition, or about 0.01 wt % or less of the resin composition, or about 0.05 wt % or less, or about 0.1 wt %, 0.5, 1, 2, 3, 4, 5, 10, 15, 20, 25, 30, 35, 40, 45, 50, 55, 60, 65, 70, 75, 80, 85, 90, 95, 96, 97, 98, 99, 99.5, 99.9, 99.95 wt %, or about 99.99 wt % or more of the resin composition.

Hardenable Composition.

The methods and compositions of the present invention can include a resin composition including a hardenable composition. The hardenable composition can include any one or more suitable components. The hardenable composition can include a hardenable resin. After reacting the hardenable resin composition with the hardening composition to form the hardened resin composition, components of the hardenable composition such as the hardenable resin can be present in the hardened resin composition in one or more of: the same chemical form, and a chemically transformed form (e.g., with the formation of intramolecular bonds, intermolecular bonds to other molecules of components of the hardenable composition, intermolecular bonds to components of the hardening composition, or a combination thereof). After reacting the hardenable resin composition with the hardening composition to provide the hardened resin composition, any one or more of the forms of the hardenable resin or other components of the hardenable composition therein can provide the hardened resin composition with consolidation properties. The consolidation properties can include reducing or eliminating the production of sand, fines, or other particles from a subterranean formation. The consolidation properties can include bonding particles such as sand, fines, or proppant, wherein the bonding can be bonding between the particles, bonding between particles and the surrounding formation, or a combination thereof. The consolidation properties can include binding particulates to achieve stabilization while preserving or achieving permeability such that viable hydrocarbon production rates from and through the consolidated material can occur. In some embodiments, the hardenable resin in the hardened resin composition is at least partially responsible for the consolidation properties thereof. In some embodiments, other components of the hardenable composition can be at least partially responsible for the consolidation properties of the hardened resin composition. In some embodiments, one or more components of the hardening composition can be at least partially responsible for the consolidation properties of the hardened resin composition.

The hardenable resin can be any suitable hardenable composition, such that it can be used to form a hardenable composition that performs as described herein. In some embodiments, the hardenable resin can include an organic hardenable resin. In some embodiments, the hardenable resin can include at least one of an epoxide-containing hardenable resin, a polyepoxide hardenable resin, a novolak hardenable resin, a polyester hardenable resin, phenolaldehyde hardenable resin, a urea-aldehyde hardenable resins, a furan hardenable resin, a urethane hardenable resins, and a glycidyl ether hardenable resin. In some embodiments, the hardenable resin can include at least one of bisphenol A diglycidyl ether hardenable resin, butoxymethyl butyl glycidyl ether hardenable resin, bisphenol A-epichlorohydrin hardenable resin, and bisphenol F hardenable resin.

The hardenable resin can be any suitable proportion of the hardenable composition. For example, the hardenable resin can be about 0.01 wt % to about 100 wt % of the hardenable composition, or about 70 wt % to about 100 wt % of the hardenable composition, or about 0.01 wt % or less, or about 0.05 wt %, 0.1, 0.5, 1, 2, 3, 4, 5, 10, 15, 20, 25, 30, 35, 40, 45, 50, 55, 60, 65, 70, 75, 80, 85, 90, 95, 96, 97, 98, 99, 99.5, 99.9, 99.95, 99.99 wt %, or about 99.999 wt % or more of the hardenable composition. The hardenable composition can be any suitable proportion of the resin composition. For example, the hardenable composition can be about 0.01 wt % to about 99.99 wt % of the resin composition, or about 10 wt % to about 90 wt % of the resin composition, or about 0.01 wt % or less, or about 0.05 wt %, 0.1, 0.5, 1, 2, 3, 4, 5, 10, 15, 20, 25, 30, 35, 40, 45, 50, 55, 60, 65, 70, 75, 80, 85, 90, 95, 96, 97, 98, 99, 99.5, 99.9, 99.95, 99.99 wt %, or about 99.999 wt % or more of the resin composition.

Hardening Composition.

The methods and compositions of the present invention can include a resin composition including a hardening composition. The hardening composition can include any one or more suitable components. The hardening composition can include a hardening agent, such as a water control hardening agent. After reacting the hardening composition with the hardenable composition to provide the hardened resin composition, the hardening, components of the hardening composition such as the water control hardening agent can be present in the hardened resin composition in one or more of: the same chemical form, and a chemically transformed form (e.g., with formation of intramolecular bonds, intermolecular bonds to other molecules of components of the hardening composition, intermolecular bonds to components of the hardenable composition, or a combination thereof). After reacting the hardening composition with the hardenable composition to provide the hardened resin composition, any one or more of the forms of the hardening composition can provide the hardened resin composition with water control properties. The water control properties can include reducing or eliminating the production of water from a subterranean formation. The water control properties can include selectively allowing hydrocarbons to flow through one or more perforations, fractures, or other flow paths, while preventing or reducing the flow of water through the flow path. The water control properties can include at least partially sealing water-producing flow paths such as one or more perforations, fractures, or channels, away from petroleum-producing flow paths, while preserving or achieving permeability such that viable hydrocarbon production rates from and through the treated formation can occur. In some embodiments, the water control hardening agent in the hardened resin composition is at least partially responsible for the water control properties thereof. In some embodiments, other components of the hardening composition can be at least partially responsible for the water control properties of the hardened resin composition. In some embodiments, one or more components of the hardenable composition can be at least partially responsible for the water control properties of the hardened resin composition.

In various embodiments, the water control hardening agent can be a polymer having Structure I Structure I

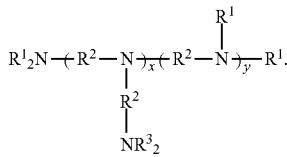

The polymer of Structure I can be a block or random copolymer wherein each repeating unit at each occurrence independently occurs in the orientation shown in Structure I or in an opposite orientation. The variable $R^1$ at each occurrence can be independently selected from the group consisting of —H and $C_1$-$C_{10}$ substituted or unsubstituted hydrocarbyl (e.g., a $C_1$-$C_{10}$ hydrocarbyl group that is substituted or unsubstituted as defined herein). The variable $R^2$ at each occurrence can be independently $C_1$-$C_{10}$ substituted or unsubstituted hydrocarbylene. The variable $R^3$ at each occurrence can be independently selected from the group consisting of $R^1$ and —$R^2$—$NR^3{}_2$. In some embodiments, $0 \le x \le 25{,}000$, $0 \le y \le 25{,}000$, and $2 \le x+y \le 25{,}000$. In some embodiments, $R^1$ at each occurrence can be independently selected from the group consisting of —H and $C_1$-$C_5$ substituted or unsubstituted hydrocarbyl. The variable $R^2$ at each occurrence can be independently $C_1$-$C_5$ substituted or unsubstituted hydrocarbylene. In some embodiments, $0 \le x \le 10{,}000$, $0 \le y \le 10{,}000$, and $2 \le x+y \le 10{,}000$. In various embodiments, $R^1$ at each occurrence can be independently selected from the group consisting of —H, methyl, ethyl, and propyl. The variable $R^2$ at each occurrence can be independently selected from the group consisting of methylene, ethylene, and propylene. In some embodiments, $0 \le x \le 5{,}000$, $0 \le y \le 5{,}000$, and $5 \le x+y \le 5{,}000$. In various embodiments, $R^1$ can be —H, $R^2$ can be ethylene, and $R^3$ at each occurrence can be independently selected from the group consisting of $R^1$ and —$CH_2CH_2$—$NR^3{}_2$. In some embodiments, $0 \le x \le 2{,}500$, $0 \le y \le 2{,}500$, and $10 \le x+y \le 2{,}500$. In some embodiments, the polymer of structure I can have the structure

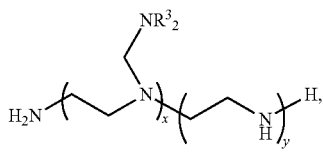

wherein the variable $R^3$ at each occurrence can be independently selected from the group consisting of —H and —$CH_2$—$CH_2$—$NR^3{}_2$. The water control hardening agent can have any suitable molecular weight, such as about 300 g/mol to about 200,000 g/mol, or about 600 g/mol to about 100,000 g/mol, or about 300 g/mol or less, or about 400 g/mol, 500, 600, 700, 800, 900, 1,000, 1,500, 2,000, 2,500, 5,000, 7,500, 10,000, 15,000, 20,000, 25,000, 50,000, 75,000, 100,000, 125,000, 150,000, 175,000 g/mol, or about 200,000 g/mol or more. In various embodiments, the water control hardening agent can be polyethyleneimine, such as any suitable polyethyleneimine.

In various embodiments, the water control hardening agent can be a polymer having Structure II Structure II

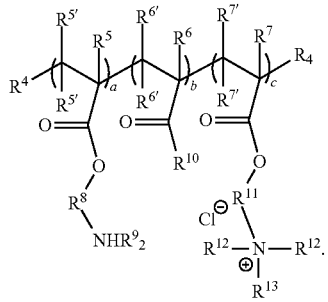

The polymer of Structure II can be a block or random copolymer wherein each repeating unit at each occurrence independently occurs in the orientation shown in Structure I or in an opposite orientation. Each of $R^4$, $R^5$, $R^{5'}$, $R^6$, $R^{6'}$, $R^7$, and $R^{7'}$ at each occurrence can be independently selected from the group consisting of —H and $C_1$-$C_{10}$ substituted or unsubstituted hydrocarbyl. Each of $R^8$ and $R^{11}$ at each occurrence can be independently $C_1$-$C_{10}$ substituted or unsubstituted hydrocarbylene. Each of $R^9$ and $R^{12}$ at each occurrence can be independently selected from the group consisting of —H and $C_1$-$C_{10}$ substituted or unsubstituted hydrocarbyl. The variable $R^{10}$ at each occurrence can be independently selected from the group consisting of —OH, —O$^-$, and —O$^-$CI$^+$ wherein CI$^+$ is a counter-ion. The variable $R^{13}$ at each occurrence can be independently selected from the group consisting of —H and $C_1$-$C_{50}$ substituted or unsubstituted hydrocarbyl. The variable CI$^-$ is a counter-ion that is optionally present or not present. The variables a, b, and c are mole fractions. In various embodiments, $a+b+c=1$, $0.01 \le a \le 99.98$, $0.01 \le b \le 99.98$, and $0.01 \le c \le 99.98$. In some embodiments, each of $R^4$, $R^5$, $R^{5'}$, $R^6$, $R^{6'}$, $R^7$, and $R^{7'}$ at each occurrence can be independently selected from the group consisting of —H and $C_1$-$C_5$ hydrocarbyl. Each of $R^8$ and $R^{11}$ at each occurrence can be independently $C_1$-$C_5$ substituted or unsubstituted hydrocarbylene. Each of $R^9$ and $R^{12}$ at each occurrence can be independently selected from the group consisting of —H and $C_1$-$C_5$ substituted or unsubstituted hydrocarbyl. The variable $R^{13}$ at each occurrence can be independently a $C_5$-$C_{40}$ substituted or unsubstituted hydrocarbyl. In some embodiments, $0.5 \le a \le 99.98$, $0.01 \le b \le 0.5$, and $0.01 \le c \le 0.5$. In various embodiments, each of $R^4$, $R^5$, $R^{5'}$, $R^6$, $R^{6'}$, $R^7$, and $R^{7'}$ at each occurrence can be independently selected from the group consisting of —H, methyl, ethyl, and propyl. Each of $R^8$ and $R^{11}$ at each occurrence can be independently selected from the group consisting of methylene, ethylene, and propylene. Each of $R^9$ and $R^{12}$ at each occurrence can be independently selected from the group consisting of —H, methyl, ethyl, and propyl. The variable $R^{13}$ at each occurrence can be independently a $C_{10}$-$C_{30}$ substituted or unsubstituted hydrocarbyl. In some embodiments, $0.8 \le a \le 99.98$, $0.01 \le b \le 0.2$, and $0.01 \le c \le 0.2$. In various embodiments, each of $R^4$, $R^{5'}$, $R^6$, $R^{6'}$, and $R^{7'}$ is —H. Each of $R^8$ and $R^{11}$ can be ethylene. Each of $R^5$, $R^9$ and $R^{12}$ can be methyl. The variable $R^{10}$ can be —O$^-$. The variable $R^{13}$ can be a hexadecanyl group. The variable CI$^-$ can be not present. The variable a can be about 0.9, b can be about 0.05, and c can be about 0.05. In some embodiments, the polymer of Structure II can have the structure

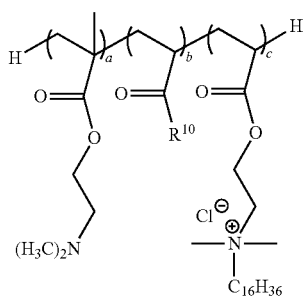

wherein a can be about 0.9, b can be about 0.05, c can be about 0.05. the variable $R^{10}$ at each occurrence can be independently selected from the group consisting of —OH, —O⁻, and —O⁻CI⁺ wherein CI⁺ is a counter-ion, and CI⁻ is a counter-ion that is optionally present or not present.

In various embodiments, CI⁺ is any suitable positively charged counter-ion, such as any suitable positively charged counter-ion. For example, the counter-ion can be sodium ($Na^+$), potassium ($K^+$), lithium ($Li^+$), hydrogen ($H^+$), zinc ($Zn^+$), or ammonium ($NH_4^+$). In some embodiments, the counter-ion can have a positive charge greater than +1, which can in some embodiments complex to multiple ionized groups, such as $Ca^{2+}$, $Mg^{2+}$, $Zn^{2+}$ or $Al^{3+}$.

In various embodiments, CI⁻ is any negatively charged counter-ion, such as any suitable negatively charged counter-ion. For example, the counter-ion can be a halide, such as fluoro, chloro, iodo, or bromo. In other examples, the counter-ion can be nitrate, hydrogen sulfate, dihydrogen phosphate, bicarbonate, nitrite, perchlorate, iodate, chlorate, bromate, chlorite, hypochlorite, hypobromite, cyanide, amide, cyanate, hydroxide, permanganate. The counter-ion can be a conjugate base of any carboxylic acid, such as acetate or formate. In some embodiments, a counter-ion can have a negative charge greater than −1, which can in some embodiments complex to multiple ionized groups, such as oxide, sulfide, nitride, arsenate, phosphate, arsenite, hydrogen phosphate, sulfate, thiosulfate, sulfite, carbonate, chromate, dichromate, peroxide, or oxalate.

The water control hardening agent can have any suitable molecular weight. For example, the water control hardening agent can have a molecular weight of about 100,000 g/mol to about 6,000,000 g/mol, or about 250,000 g/mol to about 3,000,000 g/mol, or about 10,000 g/mol or less, or about 25,000 g/mol, 50,000, 75,000, 100,000, 125,000, 150,000, 175,000, 200,000, 225,000, 250,000, 300,000, 400,000, 500,000, 600,000, 700,000, 800,000, 900,000, 1,000,000, 1,250,000, 1,500,000, 1,750,000, 2,000,000, 2,250,000, 2,500,000, 2,750,000, 3,000,000, 3,500,000, 4,000,000, 4,500,000, 5,000,000, 5,500,000 g/mol, or about 6,000,000 g/mol or more.

The water control hardening agent can be any suitable proportion of the hardening composition. For example, the water control hardening agent can be about 0.01 wt % to about 100 wt % of the hardenable composition, or about 40 wt % to about 60 wt % of the hardening composition, or about 0.01 wt % or less, or about 0.05 wt %, 0.1, 0.5, 1, 2, 3, 4, 5, 10, 15, 20, 25, 30, 35, 40, 41, 42, 43, 44, 45, 46, 47, 48, 49, 50, 51, 52, 53, 54, 55, 56, 57, 58, 59, 60, 65, 70, 75, 80, 85, 90, 95, 96, 97, 98, 99, 99.5, 99.9, 99.95, 99.99 wt %, or about 99.999 wt % or more of the hardening composition. The hardening composition can be any suitable proportion of the resin composition. For example, the hardening composition can be about 0.01 wt % to about 99.99 wt % of the resin composition, or about 10 wt % to about 90 wt % of the resin composition, or about 0.01 wt % or less, or about 0.05 wt %, 0.1, 0.5, 1, 2, 3, 4, 5, 10, 15, 20, 25, 30, 35, 40, 45, 50, 55, 60, 65, 70, 75, 80, 85, 90, 95, 96, 97, 98, 99, 99.5, 99.9, 99.95, 99.99 wt %, or about 99.999 wt % or more of the resin composition.

Other Components

In some embodiments, in addition to the hardenable resin in the hardenable composition, the resin composition includes another hardenable resin that can be the same or different. For example, at least one of the hardening composition and the hardenable composition can include a hardenable resin in addition to the hardenable resin in the hardenable composition. In some embodiments, an additional hardenable resin is included. In some embodiments an additional hardenable resin is not included. The additional hardenable resin can be any suitable hardenable resin, such that the composition can be used as described herein. In various embodiments, the additional hardenable resin can be at least one of at least one of an epoxide-containing hardenable resin, a polyepoxide hardenable resin, a novolak hardenable resin, a polyester hardenable resin, a phenolaldehyde hardenable resin, a phenolic-based hardenable resin, a urea-aldehyde hardenable resins, a furan-containing hardenable resin, a urethane hardenable resins, and a glycidyl ether hardenable resin. The additional hardenable resin can be present in the resin composition in any suitable amount, such as about 0.001 wt % to about 80 wt % of the resin composition, about 0.001 wt % to about 50 wt %, about 0.01 wt % to about 25 wt %, or about 0.1 wt % to about 10 wt % of the resin composition, or about 0.001 wt % or less, or about 0.005, 0.01, 0.05, 0.1, 0.5, 1, 2, 3, 4, 5, 10, 15, 20, 25, 30, 35, 40, 45, 50, 55, 60, 65, 70, 75 wt %, or about 80 wt % or more of the resin composition.

In some embodiments, the composition includes an organic compound including at least one of an amine and an amide; for example, at least one of the hardening composition and the hardenable composition can include an organic compound including at least one of an amine and an amide. In some embodiments, an amine or amide is included. In some embodiments an amine or amide is not included. The amine or amide can be any suitable organic compound including an amine or amide, such that the composition can be used as described herein. In some examples, the amine is an aromatic amine, an aliphatic amine, a cyclo-aliphatic amine, a polyamine, or a combination thereof, wherein the amide is a mono- or polyamide. In some examples, the hardening composition includes at least one of piperidine, triethylamine, benzyldimethylamine, N,N-dimethylaminopyridine, 2-(N,N-dimethylaminomethyl)phenol, tris(dimethylaminomethyl)phenol, 4,4'-diaminodiphenyl sulfone, and 2-ethyl-4-methyl imidazole. The organic compound including an amine or amide can be present in the resin composition in any suitable amount. For example, the organic compound including an amine or amide can be about 0.001 wt % to about 20 wt % of the resin composition, or about 0.1 wt % to about 10 wt % of the resin composition, or about 0.001 wt % or less, or about 0.005, 0.01, 0.05, 0.1, 0.5, 1, 2, 3, 4, 5, 6, 7, 8, 9, 10, 11, 12, 13, 14, 15, 16, 17, 18, 19, or about 20 wt % or more of the resin composition.

In some embodiments, the composition includes a silane coupling agent; for example, the at least one of the hardening composition and the hardenable composition can include a silence coupling agent. In some embodiments, a silane coupling agent is included. In some embodiments a silane coupling agent is not included. The silane coupling agent can be any suitable silane coupling agent, such that the composition can be used as described herein. The silane coupling agent can be a hydrocarbyl-substituted trimethoxysilane, wherein the hydrocarbyl group is substituted or unsubstituted. The silane coupling agent is at least one of N-2-(aminoethyl)-3-aminopropyltrimethyloxysilane, 3-glycidoxypropyltrimethyoxysilane, and n-beta-(aminoethyl)-gamma-aminopropyltrimethoxysilane. The silane coupling agent can be present in the resin composition in any suitable amount. For example, the silane coupling agent can be about 0.001 wt % to about 20 wt % of the hardening composition, or about 0.1 wt % to about 3 wt % of the hardening composition, or about 0.001 wt % or less, or about 0.005, 0.01, 0.05, 0.1, 0.5, 1, 2, 3, 4, 5, 6, 7, 8, 9, 10, 11, 12, 13, 14, 15, 16, 17, 18, 19, or about 20 wt % or more of the hardening composition.

In some embodiments, the composition includes a hydrolyzable ester; for example, the hardening composition can include a hydrolyzable ester. In some embodiments, a hydrolyzable ester is included. In some embodiments hydrolyzable ester is not included. The hydrolyzable ester can be any suitable hydrolyzable ester, such that the composition can be used as described herein. In some embodiments, the hydrolyzable ester is a $C_1$-$C_5$ mono-, di-, tri-, or tetra-alkyl ester of a $C_2$-$C_{40}$ mono-, di-, tri-, or tetra-carboxylic acid. The hydrolyzable ester can be at least one of dimethylglutarate, dimethyladipate, dimethylsuccinate, sorbitol, catechol, dimethylthiolate, methyl salicylate, dimethylsalicylate, and ter-butylhydroperoxide. The hydrolyzable ester can be present in the resin composition in any suitable amount. For example, the hydrolyzable ester can be about 0.01 wt % to about 20 wt % of the resin composition, or about 0.1 wt % to about 5 wt % of the resin composition, or about 0.001 wt % or less, or about 0.005, 0.01, 0.05, 0.1, 0.5, 1, 1.5, 2, 2.5, 3, 4, 5, 6, 7, 8, 9, 10, 11, 12, 13, 14, 15, 16, 17, 18, 19, or about 20 wt % or more of the resin composition.

In some embodiments, the resin composition includes a surfactant; for example, at least one of the hardening composition and the hardenable composition can include a surfactant. In some embodiments, a surfactant is included. In some embodiments a surfactant is not included. The surfactant can be any suitable surfactant, such as a surfactant commonly used to generate oil/water emulsions or other types of emulsions. The surfactant can be cationic, anionic or non-ionic. The surfactant can be aqueous, non-aqueous, and in diluted or undiluted form.

In some embodiments, the surfactant is at least one of ethoxylated nonyl phenol phosphate ester and a $C_{12}$-$C_{22}$ alkyl phosphonate. The surfactant can be present in the resin composition in any suitable amount. For example, the surfactant can be about 0.01 wt % to about 10 wt % of the hardening composition, or about 0.1 wt % to about 5 wt % of the hardening composition, or about 0.01 wt % or less, or about 0.05 wt %, 0.1, 0.5, 1, 2, 3, 4, 5, 10, 15, 20, 25, 30, 35, 40, 45, or about 50 wt % or more of the hardening composition.

In one example, the surfactant is sorbitan monooletate. In one example, the surfactant can be a non-ionic surfactant. Examples of non-ionic surfactants can include polyoxyethylene alkyl ethers, polyoxyethylene alkylphenol ethers, polyoxyethylene lauryl ethers, polyoxyethylene sorbitan monoleates, polyoxyethylene alkyl esters, polyoxyethylene sorbitan alkyl esters, polyethylene glycol, polypropylene glycol, diethylene glycol, ethoxylated trimethylnonanols, polyoxyalkylene glycol modified polysiloxane surfactants, and mixtures, copolymers or reaction products thereof. In one example, the surfactant is polyglycol-modified trimethylsilylated silicate surfactant.

Examples of suitable cationic surfactants can include, but are not limited to, quaternary ammonium hydroxides such as octyl trimethyl ammonium hydroxide, dodecyl trimethyl ammonium hydroxide, hexadecyl trimethyl ammonium hydroxide, octyl dimethyl benzyl ammonium hydroxide, decyl dimethyl benzyl ammonium hydroxide, didodecyl dimethyl ammonium hydroxide, dioctadecyl dimethyl ammonium hydroxide, tallow trimethyl ammonium hydroxide and coco trimethyl ammonium hydroxide as well as corresponding salts of these materials, fatty amines and fatty acid amides and their derivatives, basic pyridinium compounds, and quaternary ammonium bases of benzimidazolines and poly(ethoxylated/propoxylated) amines Examples of suitable anionic surfactants can include, but are not limited to, alkyl sulphates such as lauryl sulphate, polymers such as acrylates/$C_{10-30}$ alkyl acrylate crosspolymer alkylbenzenesulfonic acids and salts such as hexylbenzenesulfonic acid, octylbenzenesulfonic acid, decylbenzenesulfonic acid, dodecylbenzenesulfonic acid, cetylbenzenesulfonic acid and myristylbenzenesulfonic acid; the sulphate esters of monoalkyl polyoxyethylene ethers; alkylnapthylsulfonic acid; alkali metal sulfoccinates, sulfonated glyceryl esters of fatty acids such as sulfonated monoglycerides of coconut oil acids, salts of sulfonated monovalent alcohol esters, amides of amino sulfonic acids, sulfonated products of fatty acid nitriles, sulfonated aromatic hydrocarbons, condensation products of naphthalene sulfonic acids with formaldehyde, sodium octahydroanthracene sulfonate, alkali metal alkyl sulphates, ester sulphates, and alkarylsulfonates. Anionic surfactants can include alkali metal soaps of higher fatty acids, alkylaryl sulfonates such as sodium dodecyl benzene sulfonate, long chain fatty alcohol sulfates, olefin sulfates and olefin sulfonates, sulfated monoglycerides, sulfated esters, sulfonated ethoxylated alcohols, sulfosuccinates, alkane sulfonates, phosphate esters, alkyl isethionates, alkyl taurates, and alkyl sarcosinates.

Examples of suitable non-ionic surfactants can include, but are not limited to, condensates of ethylene oxide with long chain fatty alcohols or fatty acids such as a ($C_{12-16}$) alcohol, condensates of ethylene oxide with an amine or an amide, condensation products of ethylene and propylene oxide, esters of glycerol, sucrose, sorbitol, fatty acid alkylol amides, sucrose esters, fluoro-surfactants, fatty amine oxides, polyoxyalkylene alkyl ethers such as polyethylene glycol long chain alkyl ether, polyoxyalkylene sorbitan ethers, polyoxyalkylene alkoxylate esters, polyoxyalkylene alkylphenol ethers, ethylene glycol propylene glycol copolymers and alkylpolysaccharides, polymeric surfactants such as polyvinyl alcohol (PVA) and polyvinylmethylether. In certain embodiments, the surfactant is a polyoxyethylene fatty alcohol or mixture of polyoxyethylene fatty alcohols. In other embodiments, the surfactant is an aqueous dispersion of a polyoxyethylene fatty alcohol or mixture of polyoxyethylene fatty alcohols.

In some embodiments, the surfactant can be selected from Tergitol™ 15-s-3, Tergitol™ 15-s-40, sorbitan monooleate, polylycol-modified trimethsilylated silicate, polyglycol-modified siloxanes, polyglycol-modified silicas, ethoxylated quaternary ammonium salt solutions, and cetyltrimethylammonium chloride solutions.

In some embodiments, the resin composition can include 1,1,3-trichlorotrifluoroacetone.

Downhole Mixture or Composition.

The resin composition including the hardenable composition and the hardening composition can be combined with any suitable downhole fluid before, during, or after the contacting of the composition and the subterranean material. In some examples, the resin composition is combined with a downhole fluid above the surface, then the combined composition is placed downhole and contacted with a subterranean material. In another example, the resin composition is injected downhole to combine with a downhole fluid, and the combined composition is contacted with a subterranean material. In various examples, at least one of prior to, during, and after the contacting of the subterranean material and the composition, the composition is used downhole, at least one of alone and in combination with other materials, as a drilling fluid, stimulation fluid, fracturing fluid, spotting fluid, clean-up fluid, production fluid, completion fluid, remedial treatment fluid, abandonment fluid, pill, acidizing fluid, cementing fluid, packer fluid, or a combination thereof.

In various embodiments, the method includes combining the resin composition including the hardenable composition and the hardening composition with any suitable downhole fluid, such as an aqueous or oil-based fluid including a drilling fluid, stimulation fluid, fracturing fluid, spotting fluid, clean-up fluid, production fluid, completion fluid, remedial treatment fluid, abandonment fluid, pill, acidizing fluid, cementing fluid, packer fluid, or a combination thereof, to form a mixture. The contacting of the subterranean material and the composition can include contacting the subterranean material and the mixture. A mixture that is contacted with the subterranean material can include any suitable weight percent of the resin composition, such as about 0.000,000,01 wt % to 99.999,99 wt %, 0.000,1-99.9 wt %, 0.1 wt % to 99.9 wt %, or about 20-90 wt %, or about 0.000,000,01 wt % or less, or about 0.000,001 wt %, 0.000,1, 0.001, 0.01, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99, 99.999, 99.999,9, or about 99.999,99 wt % or more of the resin composition.

In some embodiments, the composition can include any suitable amount of any suitable material used in a downhole fluid. For example, the composition can include water, saline, aqueous base, oil, organic solvent, synthetic fluid oil phase, aqueous solution, alcohol or polyol, cellulose, starch, alkalinity control agents, density control agents, density modifiers, emulsifiers, dispersants, polymeric stabilizers, crosslinking agents, polyacrylamide, a polymer or combination of polymers, antioxidants, heat stabilizers, foam control agents, solvents, diluents, plasticizer, filler or inorganic particle, pigment, dye, precipitating agent, rheology modifier, oil-wetting agents, set retarding additives, surfactants, gases, weight reducing additives, heavy-weight additives, lost circulation materials, filtration control additives, dispersants, salts, fibers, thixotropic additives, breakers, crosslinkers, rheology modifiers, curing accelerators, curing retarders, pH modifiers, chelating agents, scale inhibitors, enzymes, resins, water control materials, oxidizers, markers, Portland cement, pozzolana cement, gypsum cement, high alumina content cement, slag cement, silica cement fly ash, metakaolin, shale, zeolite, a crystalline silica compound, amorphous silica, hydratable clays, microspheres, pozzolan lime, or a combination thereof.

A drilling fluid, also known as a drilling mud or simply "mud," is a specially designed fluid that is circulated through a wellbore as the wellbore is being drilled to facilitate the drilling operation. The drilling fluid can be water-based or oil-based. The drilling fluid can carry cuttings up from beneath and around the bit, transport them up the annulus, and allow their separation. Also, a drilling fluid can cool and lubricate the drill head as well as reducing friction between the drill string and the sides of the hole. The drilling fluid aids in support of the drill pipe and drill head, and provides a hydrostatic head to maintain the integrity of the wellbore walls and prevent well blowouts. Specific drilling fluid systems can be selected to optimize a drilling operation in accordance with the characteristics of a particular geological formation. The drilling fluid can be formulated to prevent unwanted influxes of formation fluids from permeable rocks penetrated and also to form a thin, low permeability filter cake which temporarily seals pores, other openings, and formations penetrated by the bit. In water-based drilling fluids, solid particles are suspended in a water or brine solution containing other components. Oils or other non-aqueous liquids can be emulsified in the water or brine or at least partially solubilized (for less hydrophobic non-aqueous liquids), but water is the continuous phase.

A water-based drilling fluid in embodiments of the present invention can be any suitable water-based drilling fluid. In various embodiments, the drilling fluid can include at least one of water (fresh or brine), a salt (e.g., calcium chloride, sodium chloride, potassium chloride, magnesium chloride, calcium bromide, sodium bromide, potassium bromide, calcium nitrate, sodium formate, potassium formate, cesium formate), aqueous base (e.g., sodium hydroxide or potassium hydroxide), alcohol or polyol, cellulose, starches, alkalinity control agents, density control agents such as a density modifier (e.g. barium sulfate), surfactants (e.g. betaines, alkali metal alkylene acetates, sultaines, ether carboxylates), emulsifiers, dispersants, polymeric stabilizers, crosslinking agents, polyacrylamides, polymers or combinations of polymers, antioxidants, heat stabilizers, foam control agents, solvents, diluents, plasticizers, filler or inorganic particles (e.g. silica), pigments, dyes, precipitating agents (e.g., silicates or aluminum complexes), and rheology modifiers such as thickeners or viscosifiers (e.g., xanthan gum). Any ingredient listed in this paragraph can be either present or not present in the mixture. The drilling fluid can be present in the mixture with the resin in any suitable amount, such as about 1 wt % or less, about 2 wt %, 3, 4, 5, 10, 15, 20, 30, 40, 50, 60, 70, 80, 85, 90, 95, 96, 97, 98, 99, 99.9, 99.99, 99.999, or about 99.9999 wt % or more of the mixture.

An oil-based drilling fluid or mud in embodiments of the present invention can be any suitable oil-based drilling fluid. In various embodiments the drilling fluid can include at least one of an oil-based fluid (or synthetic fluid), saline, aqueous solution, emulsifiers, other agents of additives for suspension control, weight or density control, oil-wetting agents, fluid loss or filtration control agents, and rheology control agents. For example, see H. C. H. Darley and George R. Gray, Composition and Properties of Drilling and Completion Fluids 66-67, 561-562 ($5^{th}$ ed. 1988). An oil-based or invert emulsion-based drilling fluid can include between about 50:50 to about 95:5 by volume of oil phase to water phase. A substantially all oil mud includes about 100% liquid phase oil by volume; e.g., substantially no internal aqueous phase.

A pill is a relatively small quantity (e.g. less than about 500 bbl, or less than about 200 bbl) of drilling fluid used to accomplish a specific task that the regular drilling fluid cannot perform. For example, a pill can be a high-viscosity pill to, for example, help lift cuttings out of a vertical wellbore. In another example, a pill can be a freshwater pill to, for example, dissolve a salt formation. Another example is a pipe-freeing pill to, for example, destroy filter cake and relieve differential sticking forces. In another example, a pill is a lost circulation material pill to, for example, plug a thief zone. A pill can include any component described herein as a component of a drilling fluid.

A cement fluid can include an aqueous mixture of at least one of cement and cement kiln dust. The resin composition can form a useful combination with cement or cement kiln dust. The cement kiln dust can be any suitable cement kiln dust. Cement kiln dust can be formed during the manufacture of cement and can be partially calcined kiln feed which is removed from the gas stream and collected in a dust collector during manufacturing process. Cement kiln dust can be advantageously utilized in a cost-effective manner since kiln dust is often regarded as a low value waste product of the cement industry. Some embodiments of the cement fluid can include cement kiln dust but no cement, cement kiln dust and cement, or cement but no cement kiln dust. The cement can be any suitable cement. The cement can be a hydraulic cement. A variety of cements can be utilized in accordance with the present invention, for example, those including calcium, aluminum, silicon, oxygen, iron, or sulfur, which can set and harden by reaction with water. Suitable cements can include Portland cements, pozzolana cements, gypsum cements, high alumina content cements, slag cements, silica cements, and combinations thereof. In some embodiments, the Portland cements that are suitable for use in the present invention are classified as Classes A, C, H, and G cements according to the American Petroleum Institute, *API Specification for Materials and Testing for Well Cements*, API Specification 10, Fifth Ed., Jul. 1, 1990. A cement can be generally included in the cementing fluid in an amount sufficient to provide the desired compressive strength, density, or cost. In some embodiments, the hydraulic cement can be present in the cementing fluid in an amount in the range of from 0 wt % to about 100 wt %, 0-95 wt %, 20-95 wt %, or about 50-90 wt %. A cement kiln dust can be present in an amount of at least about 0.01 wt %, or about 5 wt %-80 wt %, or about 10 wt % to about 50 wt %.

Optionally, other additives can be added to a cement or kiln dust-containing composition of the present invention as deemed appropriate by one skilled in the art, with the benefit of this disclosure. Any optional ingredient listed in this paragraph can be either present or not present in the composition. For example, the composition can include fly ash, metakaolin, shale, zeolite, set retarding additive, surfactant, a gas, accelerators, weight reducing additives, heavy-weight additives, lost circulation materials, filtration control additives, dispersants, and combinations thereof. In some examples, additives can include crystalline silica compounds, amorphous silica, salts, fibers, hydratable clays, microspheres, pozzolan lime, thixotropic additives, combinations thereof, and the like.

In various embodiments, the present invention can include a proppant, a resin-coated proppant, an encapsulated resin, or a combination thereof. A proppant is a material that keeps an induced hydraulic fracture at least partially open during or after a fracturing treatment. Proppants can be transported downhole to the fracture using fluid, such as fracturing fluid or another fluid. A higher-viscosity fluid can more effectively transport proppants to a desired location in a fracture, especially larger proppants, by more effectively keeping proppants in a suspended state within the fluid.

The composition can include a payload material. The payload can be deposited in any suitable downhole location. The method can include using the composition to deposit a payload material into a subterranean fracture. The subterranean fracture can be any suitable subterranean fraction. In some embodiments, the method includes forming the subterranean fracture; in other embodiments, the subterranean fracture is already formed. The payload material can be a proppant, or any other suitable payload material, such as a resin-coated proppant, a curable material, an encapsulated resin, a resin, a Portland cement, a pozzolana cement, a gypsum cement, a high alumina content cement, a slag cement, a silica cement, a cementitious kiln dust, fly ash, metakaolin, shale, zeolite, a set retarding additive, a surfactant, a gas, an accelerator, a weight reducing additive, a heavy-weight additive, a lost circulation material, a filtration control additive, a dispersant, a crystalline silica compound, an amorphous silica, a salt, a fiber, a hydratable clay, a microsphere, pozzolan lime, a thixotropic additive, water, an aqueous base, an aqueous acid, an alcohol or polyol, a cellulose, a starch, an alkalinity control agent, a density control agent, a density modifier, a surfactant, an emulsifier, a dispersant, a polymeric stabilizer, a crosslinking agent, a polyacrylamide, a polymer or combination of polymers, an antioxidant, a heat stabilizer, a foam control agent, a solvent, a diluent, a plasticizer, a filler or inorganic particle, a pigment, a dye, a precipitating agent, a rheology modifier, or a combination thereof.

System

In various embodiments, the present invention provides a system. The system can include a resin composition including a hardenable composition that includes a hardenable resin, such as any hardenable resin described herein. The resin composition can include a hardening composition that includes a water control hardening agent. The system can also include a subterranean material downhole in contact with the resin composition, wherein the hardenable composition and the hardening composition are configured to react to give a hardened resin composition.

Composition for Treatment of a Subterranean Formation.

Various embodiments provide a composition for treatment of a subterranean formation. The composition can be any suitable composition that can be used to perform an embodiment of the method for treatment of a subterranean formation described herein.

For example, the composition can include a hardenable composition that includes a hardenable resin, such as any hardenable resin described herein. The composition can also include a hardening composition that includes a water control hardening agent, such as any water control agent described herein. For example, the water control hardening agent can be at least one of a polymer having Structure I or a polymer having Structure II. Structure I is

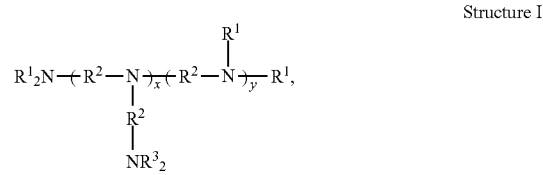

Structure I wherein the polymer of Structure I can be a block or random copolymer wherein each repeating unit at each occurrence independently occurs in the orientation shown in Structure I or in an opposite orientation. The variable $R^1$ at each occurrence can be independently selected from the group consisting of —H and $C_1$-$C_{10}$ hydrocarbyl. The variable $R^2$ at each occurrence can be independently $C_1$-$C_{10}$ hydrocarbylene. The variable $R^3$ at each occurrence can be independently selected from the group consisting of $R^1$ and —$R^2$—

$NR^3{}_2$. In some examples, $0 \leq x \leq 25{,}000$, $0 \leq y \leq 25{,}000$, and $2 \leq x+y \leq 25{,}000$. Structure II is

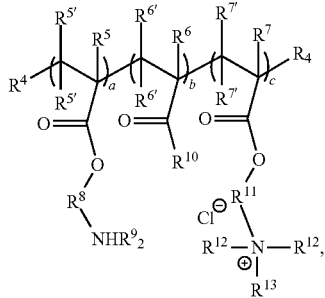

Structure II

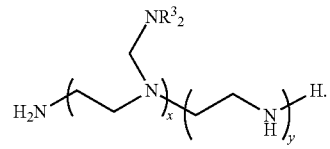

The variable $R^3$ at each occurrence can be independently selected from the group consisting of —H and —CH$_2$—CH$_2$—NR$^3{}_2$. In some examples, $0 \leq x \leq 2{,}500$, $0 \leq y \leq 2{,}500$, $10 \leq x+y \leq 2{,}500$. The molecular weight of the polymer can be about 300 g/mol to about 200,000 g/mol. The water control hardening agent can be a polymer having the structure

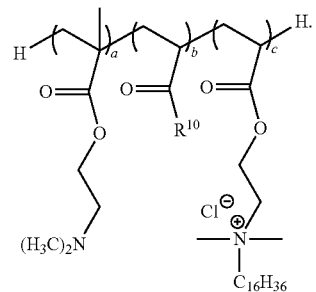

wherein the polymer of Structure II can be a block or random copolymer wherein each repeating unit at each occurrence independently occurs in the orientation shown in Structure I or in an opposite orientation. Each of $R^4$, $R^5$, $R^{5\prime}$, $R^6$, $R^{6\prime}$, $R^7$, and $R^{7\prime}$ at each occurrence can be independently selected from the group consisting of —H and $C_1$-$C_{10}$ hydrocarbyl. Each of $R^8$ and $R^{11}$ at each occurrence can be independently $C_1$-$C_{10}$ hydrocarbylene. Each of $R^9$ and $R^{12}$ at each occurrence can be independently selected from the group consisting of —H and $C_1$ $C_{10}$ hydrocarbyl. The variable $R^{10}$ at each occurrence can be independently selected from the group consisting of —OH, —O$^-$, and —O$^-$CI$^+$ wherein CI$^+$ is a counter-ion. The variable $R^{13}$ at each occurrence can be independently selected from the group consisting of —H and $C_1$-$C_{50}$ hydrocarbyl. The variable CI$^-$ is a counter-ion that is present or not present. The variables a, b, and c are mole fractions. In some embodiments, $a+b+c=1$, $0.01 \leq a \leq 99.98$, $0.01 \leq b \leq 99.98$, and $0.01 \leq c \leq 99.98$. In some embodiments, the composition further includes a downhole fluid. The downhole fluid can be any suitable downhole fluid. In some embodiments, the downhole fluid is a composition for fracturing or a subterranean material, or a fracturing fluid.

In some embodiments, the composition can include a hardenable composition including a hardenable resin, such as any hardenable resin described herein. The composition can also include a hardening composition including a water control hardening agent. The water control hardening agent can be a polymer having the structure The variables a, b, and c are mole fractions. The variable a can be about 0.9, b can be about 0.05, and c can be about 0.05. The variable $R^{10}$ at each occurrence can be independently selected from the group consisting of —OH, —O$^-$, and —O$^-$CI$^+$ wherein CI$^+$ is a counter-ion, and CI$^-$ is a counter-ion that is optionally present or not present. In the structures in this paragraph, the water control hardening agent polymer can be a block or random copolymer, each repeating unit at each occurrence independently occurring in the orientation shown, or in an opposite orientation.

Various embodiments of the present invention provide a cured product of the resin composition described herein. The cured product can be a reaction product of the hardenable composition and the hardening composition, as described herein. The reaction product can be any material included in the hardened resin described herein, such as a copolymer formed between the hardenable resin and the hardening composition. In some embodiments, the reaction product can have the following structure:

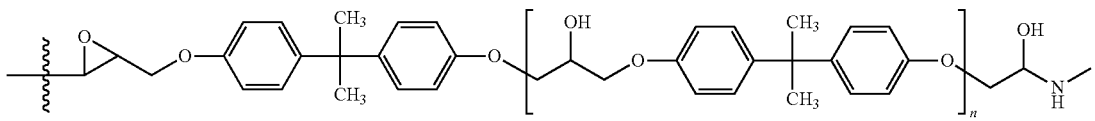

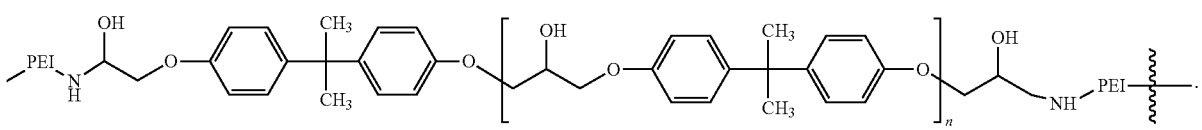

Method for Preparing a Composition for Treatment of a Subterranean Formation.

In various embodiments, the present invention provides a method for preparing a composition for treatment of a subterranean formation. The method can be any suitable method that produces a composition described herein. For example, the method can include forming a composition including a hardenable composition that includes a hardenable resin, such as any hardenable resin described herein. The composition also includes a hardening composition including a water control hardening agent, such as any water control agent described herein. For example, the water control hardening agent can be at least one of a polymer having Structure I or a polymer having Structure II. Structure I is

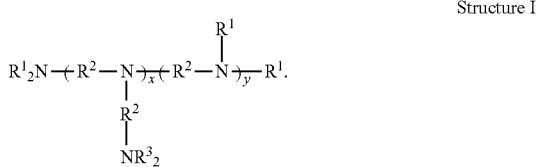

Structure I

The polymer of Structure I can be a block or random copolymer wherein each repeating unit at each occurrence independently occurs in the orientation shown in Structure I or in an opposite orientation. The variable $R^1$ at each occurrence can be independently selected from the group consisting of —H and $C_1$-$C_{10}$ hydrocarbyl. The variable $R^2$ at each occurrence can be independently $C_1$-$C_{10}$ hydrocarbylene. The variable $R^3$ at each occurrence can be independently selected from the group consisting of $R^1$ and —$R^2$—$NR^3{}_2$. In some examples, $0 \le x \le 25{,}000$, $0 \le y \le 25{,}000$, and $2 \le x+y \le 25{,}000$. Structure II is

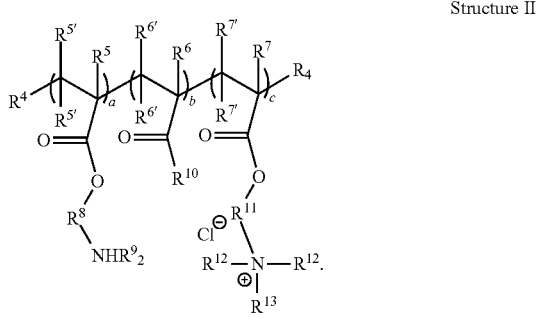

Structure II

The polymer of Structure II can be a block or random copolymer wherein each repeating unit at each occurrence independently occurs in the orientation shown in Structure I or in an opposite orientation. Each of $R^4$, $R^5$, $R^{5\prime}$, $R^6$, $R^{6\prime}$, $R^7$, and $R^{7\prime}$ at each occurrence can be independently selected from the group consisting of —H and $C_1$-$C_{10}$ hydrocarbyl. Each of $R^8$ and $R^{11}$ at each occurrence can be independently $C_1$-$C_{10}$ hydrocarbylene. Each of $R^9$ and $R^{12}$ at each occurrence can be independently selected from the group consisting of —H and $C_1$-$C_{10}$ hydrocarbyl. The variable $R^{10}$ at each occurrence can be independently selected from the group consisting of —OH, —O$^-$, and —O$^-$CI$^+$ wherein CI$^+$ is a counter-ion. The variable $R^{13}$ at each occurrence can be independently selected from the group consisting of —H and $C_1$-$C_{50}$ hydrocarbyl. The variable Cl$^-$ can be a counter-ion that is present or not present. The variables a, b, and c are mole fractions. In some embodiments, $a+b+c=1$, $0.01 \le a \le 99.98$, $0.01 \le b \le 99.98$, and $0.01 \le c \le 99.98$.

The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those of ordinary skill in the art, and that such modifications and variations are considered to be within the scope of this invention as defined by the appended claims.

Additional Embodiments

The present invention provides for the following exemplary embodiments, the numbering of which is not to be construed as designating levels of importance:

Embodiment 1 provides a method of treating a subterranean formation, the method comprising: obtaining or providing a resin composition comprising a hardenable composition comprising a hardenable resin; and a hardening composition comprising a water control hardening agent; contacting a subterranean material downhole with the resin composition; and reacting the hardenable composition and the hardening composition, to give a hardened resin composition.

Embodiment 2 provides the method of Embodiment 1, wherein the method comprises a method of water control and optionally further comprises a method of hydraulic fracturing.

Embodiment 3 provides the method of any one of Embodiments 1-2, wherein the contacting of the composition and the subterranean material comprises fracturing at least part of the subterranean material to form at least one subterranean fracture.

Embodiment 4 provides the method of any one of Embodiments 1-3, wherein the obtaining or providing of the composition occurs above the surface.

Embodiment 5 provides the method of any one of Embodiments 1-4, wherein the obtaining or providing of the composition occurs downhole.

Embodiment 6 provides the method of any one of Embodiments 1-5, wherein the reacting of the hardenable composition and the hardening composition occurs downhole.

Embodiment 7 provides the method of any one of Embodiments 1-6, wherein the reacting of the hardenable composition and the hardening composition occurs before the contacting of the composition and the subterranean material.

Embodiment 8 provides the method of any one of Embodiments 1-7, wherein reacting of the hardenable composition and the hardening composition occurs at least one of during and after the contacting of the composition and the subterranean material.

Embodiment 9 provides the method of any one of Embodiments 1-8, wherein the contacted subterranean material is a subterranean formation in an area surrounding a wellbore.

Embodiment 10 provides the method of any one of Embodiments 1-9, wherein contacting of the resin composition and the subterranean material is sufficient to saturate at least part of an area surrounding the wellbore to at least a depth of about 1 feet to about 3 feet.

Embodiment 11 provides the method of any one of Embodiments 1-10, wherein the contacted subterranean material is at least one of a fracture, flow path, perforation, and at least a part of an area surrounding at least one of a fracture, flow path, or perforation.

Embodiment 12 provides the method of Embodiment 11, wherein the resin composition is applied such that the at least part of the area surrounding the fracture is saturated to a depth of at least about 0.25 to about 2 inches.

Embodiment 13 provides the method of any one of Embodiments 1-12, wherein the hardenable resin comprises an organic hardenable resin.

Embodiment 14 provides the method of any one of Embodiments 1-13, wherein the hardenable resin comprises at least one of an epoxide-containing hardenable resin, a polyepoxide hardenable resin, a novolak hardenable resin, a polyester hardenable resin, phenolaldehyde hardenable resin, a urea-aldehyde hardenable resins, a furan hardenable resin, a urethane hardenable resins, and a glycidyl ether hardenable resin.

Embodiment 15 provides the method of any one of Embodiments 1-14, wherein the hardenable resin comprises at least one of bisphenol A diglycidyl ether hardenable resin, butoxymethyl butyl glycidyl ether hardenable resin, bisphenol A-epichlorohydrin hardenable resin, and bisphenol F hardenable resin.

Embodiment 16 provides the method of any one of Embodiments 1-15, wherein the hardenable resin comprises about 0.01 wt % to about 100 wt % of the hardenable composition.

Embodiment 17 provides the method of any one of Embodiments 1-16, wherein the hardenable resin comprises about 70 wt % to about 100 wt % of the hardenable composition.

Embodiment 18 provides the method of any one of Embodiments 1-17, wherein the hardenable composition comprises about 0.01 wt % to about 99.99 wt % of the resin composition.

Embodiment 19 provides the method of any one of Embodiments 1-18, wherein the hardenable composition comprises about 10 wt % to about 90 wt % of the resin composition.

Embodiment 20 provides the method of any one of Embodiments 1-19, wherein the water control hardening agent is a polymer having Structure I

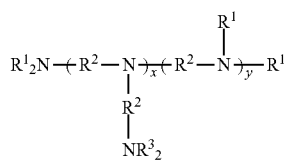

Structure I wherein the polymer of Structure I is a block or random copolymer wherein each repeating unit at each occurrence independently occurs in the orientation shown in Structure I or in an opposite orientation, $R^1$ at each occurrence is independently selected from the group consisting of —H and $C_1$-$C_{10}$ hydrocarbyl, $R^2$ at each occurrence is independently $C_1$-$C_{10}$ hydrocarbylene, $R^3$ at each occurrence is independently selected from the group consisting of $R^1$ and —$R^2$—$NR^3{}_2$, $0 \leq x \leq 25{,}000$, $0 \leq y \leq 25{,}000$, and $2 \leq x+y \leq 25{,}000$.

Embodiment 21 provides the method of Embodiment 20, wherein $R^1$ at each occurrence is independently selected from the group consisting of —H and $C_1$-$C_5$ hydrocarbyl, $R^2$ at each occurrence is independently $C_1$-$C_5$ hydrocarbylene, $0 \leq x \leq 10{,}000$, $0 \leq y \leq 10{,}000$, and $2 \leq x+y \leq 10{,}000$.

Embodiment 22 provides the method of any one of Embodiments 20-21, wherein $R^1$ at each occurrence is independently selected from the group consisting of —H, methyl, ethyl, and propyl, $R^2$ at each occurrence is independently selected from the group consisting of methylene, ethylene, and propylene, $0 \leq x \leq 5{,}000$, $0 \leq y \leq 5{,}000$, and $5 \leq x+y \leq 5{,}000$.

Embodiment 23 provides the method of any one of Embodiments 20-22, wherein $R^1$ is —H, $R^2$ is ethylene, $R^3$ at each occurrence is independently selected from the group consisting of $R^1$ and —$CH_2CH_2$—$NR^3{}_2$, $0 \leq x \leq 2{,}500$, $0 \leq y \leq 2{,}500$, and $10 \leq x+y \leq 2{,}500$.

Embodiment 24 provides the method of any one of Embodiments 20-23, wherein the water control hardening agent has the structure

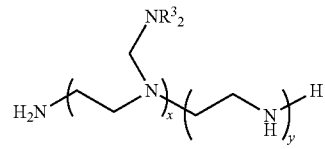

wherein $R^3$ at each occurrence is independently selected from the group consisting of —H and —$CH_2$—$CH_2$—$NR^3{}_2$.

Embodiment 25 provides the method of any one of Embodiments 20-24, wherein the water control hardening agent has a molecular weight of about 300 g/mol to about 200,000 g/mol.

Embodiment 26 provides the method of any one of Embodiments 20-25, wherein the water control hardening agent is polyethyleneimine.

Embodiment 27 provides the method of any one of Embodiments 1-26, wherein the water control hardening agent is a polymer having Structure II

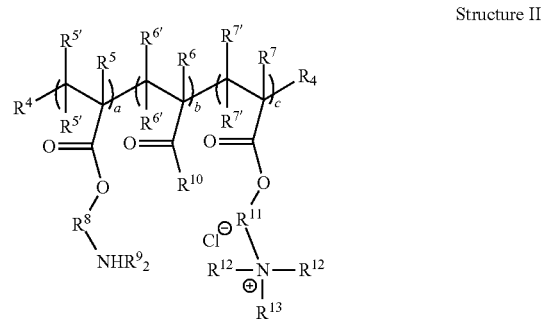

Structure II wherein the polymer of Structure II is a block or random copolymer wherein each repeating unit at each occurrence independently occurs in the orientation shown in Structure I or in an opposite orientation, each of $R^4$, $R^5$, $R^{5'}$, $R^6$, $R^{6'}$, $R^7$, and $R^{7'}$ at each occurrence is independently selected from the group consisting of —H and $C_1$-$C_{10}$ hydrocarbyl, each of $R^8$ and $R^{11}$ at each occurrence is independently $C_1$-$C_{10}$ hydrocarbylene, each of $R^9$ and $R^{12}$ at each occurrence is independently selected from the group consisting of —H and $C_1$-$C_{10}$ hydrocarbyl, $R^{10}$ at each occurrence is independently selected from the group consisting of —OH, —O⁻, and —O⁻Cl⁺ wherein Cl⁺ is a counter-ion, $R^{13}$ at each occurrence is independently selected from the group consisting of —H and $C_1$-$C_{50}$ hydrocarbyl, Cl⁻ is a counter-ion that is optionally present or not present, and a, b, and c are mole fractions, wherein a+b+c=1, 0.01≤a≤99.98, 0.01≤b≤99.98, and 0.01≤c≤99.98.

Embodiment 28 provides the method of Embodiment 27, wherein each of $R^4$, $R^5$, $R^{5'}$, $R^6$, $R^{6'}$, $R^7$, and $R^{7'}$ at each occurrence is independently selected from the group consisting of —H and $C_1$-$C_5$ hydrocarbyl, each of $R^8$ and $R^{11}$ at each occurrence is independently $C_1$-$C_5$ hydrocarbylene, each of $R^9$ and $R^{12}$ at each occurrence is independently selected from the group consisting of —H and $C_1$-$C_5$ hydrocarbyl, $R^{13}$ at each occurrence is independently a $C_5$-$C_{40}$ hydrocarbyl, 0.5≤a≤99.98, 0.01≤b≤0.5, and 0.01≤c≤0.5.

Embodiment 29 provides the method of any one of Embodiments 27-28, wherein each of $R^4$, $R^5$, $R^{5'}$, $R^6$, $R^{6'}$, $R^7$, and $R^{7'}$ at each occurrence is independently selected from the group consisting of —H, methyl, ethyl, and propyl, each of $R^8$ and $R^{11}$ at each occurrence is independently selected from the group consisting of methylene, ethylene, and propylene, each of $R^9$ and $R^{12}$ at each occurrence is independently selected from the group consisting of —H, methyl, ethyl, and propyl, $R^{13}$ at each occurrence is independently a $C_{10}$-$C_{3o}$ hydrocarbyl, 0.8≤a≤99.98, 0.01≤b≤0.2, and 0.01≤c≤0.2.

Embodiment 30 provides the method of any one of Embodiments 27-29, wherein each of $R^4$, $R^{5'}$, $R^6$, $R^{6'}$, and $R^{7'}$ is —H, each of $R^8$ and $R^{11}$ is ethylene, each of $R^5$, $R^9$ and $R^{12}$ is methyl, $R^{10}$ is —O⁻, $R^{13}$ is a hexadecanyl, Cl⁻ is not present, a is about 0.9, b is about 0.05, and c is about 0.05.

Embodiment 31 provides the method of any one of Embodiments 27-30, wherein the water control hardening agent has the structure

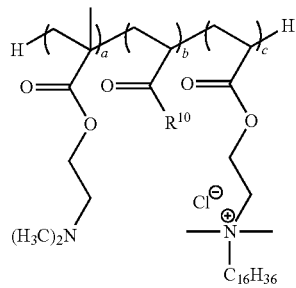

wherein a is about 0.9, b is about 0.05, c is about 0.05, $R^{10}$ at each occurrence is independently selected from the group consisting of —OH, —O⁻, and —O⁻Cl⁺ wherein Cl⁺ is a counter-ion, and Cl⁻ is a counter-ion that is optionally present or not present.

Embodiment 32 provides the method of any one of Embodiments 27-31, wherein the water control hardening agent has a molecular weight of about 100,000 g/mol to about 6,000,000 g/mol.

Embodiment 33 provides the method of any one of Embodiments 27-32, wherein the water control hardening agent has a molecular weight of about 250,000 g/mol to about 3,000,000 g/mol.

Embodiment 34 provides the method of any one of Embodiments 1-33, wherein the hardening agent comprises about 0.01 wt % to about 100 wt % of the hardening composition.

Embodiment 35 provides the method of any one of Embodiments 1-34, wherein the hardening agent comprises about 40 wt % to about 60 wt % of the hardening composition.

Embodiment 36 provides the method of any one of Embodiments 1-35, wherein the hardening composition comprises about 0.01 wt % to about 99.99 wt % of the resin composition.

Embodiment 37 provides the method of any one of Embodiments 1-36, wherein the hardening composition comprises about 10 wt % to about 90 wt % of the resin composition.

Embodiment 38 provides the method of any one of Embodiments 1-37, wherein the hardenable composition further comprises at least one of an epoxide-containing hardenable resin, a polyepoxide hardenable resin, a novolak hardenable resin, a polyester hardenable resin, a phenolaldehyde hardenable resin, a phenolic-based hardenable resin, a urea-aldehyde hardenable resins, a furan-containing hardenable resin, a urethane hardenable resins, and a glycidyl ether hardenable resin.

Embodiment 39 provides the method of any one of Embodiments 1-38, wherein the resin composition further comprises at least one organic compound comprising at least one of an amine and an amide, wherein the amine is an aromatic amine, an aliphatic amine, a cyclo-aliphatic amine, a polyamine, or a combination thereof, wherein the amide is a mono- or polyamide.

Embodiment 40 provides the method of any one of Embodiments 1-39, wherein the resin composition comprises at least one of piperidine, triethylamine, benzyldimethylamine, N,N-dimethylaminopyridine, 2-(N,N-dimethylaminomethyl)phenol, tris(dimethylaminomethyl)phenol, 4,4'-diaminodiphenyl sulfone, 2-ethyl-4-methyl imidazole, and 1,1,3-trichlorotrifluoroacetone.

Embodiment 41 provides the method of any one of Embodiments 1-40, wherein the resin composition further comprises a silane coupling agent.

Embodiment 42 provides the method of Embodiment 41, wherein the silane coupling agent is a hydrocarbyl-substituted trimethoxysilane, wherein the hydrocarbyl group is substituted or unsubstituted.

Embodiment 43 provides the method of any one of Embodiments 41-42, wherein the silane coupling agent is at least one of N-2-(aminoethyl)-3-aminopropyltrimethyloxysilane, 3-glycidoxypropyltrimethyoxysilane, and n-beta-(aminoethyl)-gamma-aminopropyltrimethoxysilane.

Embodiment 44 provides the method of any one of Embodiments 41-43, wherein the silane coupling agent is about 0.001 wt % to about 20 wt % of the hardening composition.

Embodiment 45 provides the method of any one of Embodiments 41-44, wherein the silane coupling agent is about 0.1 wt % to about 3 wt % of the hardening composition.

Embodiment 46 provides the method of any one of Embodiments 1-45, wherein the resin composition further comprises a hydrolyzable ester.

Embodiment 47 provides the method of Embodiment 46, wherein the hydrolyzable ester is a $C_1$-$C_5$ mono-, di-, tri-, or tetra-alkyl ester of a $C_2$-$C_{40}$ mono-, di-, tri-, or tetra-carboxylic acid.

Embodiment 48 provides the method of any one of Embodiments 46-47, wherein the hydrolyzable ester is at least one of dimethylglutarate, dimethyladipate, dimethylsuccinate, sorbitol, catechol, dimethylthiolate, methyl salicylate, dimethylsalicylate, and ter-butylhydroperoxide.

Embodiment 49 provides the method of any one of Embodiments 46-48, wherein the hydrolyzable ester is about 0.01 wt % to about 20 wt % of the resin composition.

Embodiment 50 provides the method of any one of Embodiments 46-49, wherein the hydrolyzable ester is about 0.1 wt % to about 5 wt % of the resin composition.

Embodiment 51 provides the method of any one of Embodiments 1-50, wherein the resin composition further comprises a surfactant.

Embodiment 52 provides the method of Embodiment 51, wherein the surfactant is at least one of a cationic surfactant, an anionic surfactant, and non-ionic surfactant.

Embodiment 53 provides the method of any one of Embodiments 51-52, wherein the surfactant is at least one of ethoxylated nonyl phenol phosphate ester and a $C_{12}$-$C_{22}$ alkyl phosphonate.

Embodiment 54 provides the method of any one of Embodiments 51-53, wherein the surfactant is about 0.01 wt % to about 10 wt % of the hardening composition.

Embodiment 55 provides the method of any one of Embodiments 51-54, wherein the surfactant is about 0.1 wt % to about 5 wt % of the hardening composition.

Embodiment 56 provides the method of any one of Embodiments 1-55, wherein the resin composition further comprises a carrier fluid.

Embodiment 57 provides the method of Embodiment 56, wherein at least one of the hardenable composition and the hardening composition comprises the carrier fluid.

Embodiment 58 provides the method of Embodiment 57, wherein the carrier fluid comprises about 0 wt % to about 80 wt % of the hardenable composition.

Embodiment 59 provides the method of any one of Embodiments 57-58, wherein the carrier fluid comprises about 0 wt % to about 30 wt % of the hardenable composition.

Embodiment 60 provides the method of any one of Embodiments 57-59, wherein the carrier fluid comprises about 0 wt % to about 80 wt % of the hardening composition.

Embodiment 61 provides the method of any one of Embodiments 57-60, wherein the carrier fluid comprises about 0 wt % to about 30 wt % of the hardening composition.

Embodiment 62 provides the method of any one of Embodiments 56-61, wherein the carrier fluid comprises at least one of an aqueous liquid and an organic liquid.

Embodiment 63 provides the method of any one of Embodiments 56-62, wherein the carrier fluid comprises at least one of dipropylene glycol methyl ether, dipropylene glycol dimethyl ether, dimethyl formamide, diethylene glycol methyl ether, ethylene glycol butyl ether, diethylene glycol butyl ether, propylene carbonate, D-limonene, a $C_2$-$C_{40}$ fatty acid $C_1$-$C_{10}$ alkyl ester, 2-butoxy ethanol, butyl acetate, furfuryl acetate, dimethyl sulfoxide, and dimethyl formamide.

Embodiment 64 provides the method of any one of Embodiments 56-63, wherein the carrier fluid is about 0.01 wt % to about 99.99 wt % of the resin composition.

Embodiment 65 provides the method of any one of Embodiments 56-64, wherein the carrier fluid is about 10 wt % to about 95 wt % of the resin composition.

Embodiment 66 provides the method of any one of Embodiments 1-65, wherein contacting the subterranean material downhole with the resin composition comprises contacting the resin composition with downhole particulates.

Embodiment 67 provides the method of any one of Embodiments 1-66, wherein the downhole particulates comprise at least one of fines, sand, gravel, and proppant.

Embodiment 68 provides the method of any one of Embodiments 1-67, wherein obtaining or providing the resin composition comprises mixing the hardenable composition and the hardening composition to provide a substantially homogenous mixture.

Embodiment 69 provides the method of any one of Embodiments 1-68, further comprising, prior to contacting the subterranean material downhole with the resin composition, mixing the resin composition with a particulate substrate to give a resin composition-particulate mixture, wherein contacting the subterranean material with the resin composition comprises contacting the subterranean material with the resin composition-particulate mixture.

Embodiment 70 provides the method of Embodiment 69, wherein the particulate substrate comprises at least one of sand, bauxite, ceramic materials, glass materials, polymer materials, tetrafluoroethylene materials, nut shell materials, seed shell materials, fruit pit materials, wood, processed wood, hollow glass microspheres, and solid glass, and composite particulates prepared from a binder and at least one of silica, alumina, fumed silica, carbon black, graphite, mica, titanium dioxide, meta-silicate, calcium silicate, kaolin, talc, zirconia, boron, and fly ash.

Embodiment 71 provides the method of any one of Embodiments 69-70, wherein the particulate substrate comprises at least one of proppant and gravel.

Embodiment 72 provides the method of any one of Embodiments 69-71, wherein the particulate substrate is about 90 wt % to about 99.999 wt % of the resin composition-particulate mixture.

Embodiment 73 provides the method of any one of Embodiments 69-72, wherein resin composition-particulate mixture is about 0.1% v/w to about 5% v/w resin composition on the particulate substrate.

Embodiment 74 provides the method of any one of Embodiments 69-73, wherein the mixing of the resin composition with a particulate substrate comprises mixing of the resin composition with a particulate substrate in a fracturing carrier fluid, wherein the resin composition-particulate mixture comprises a resin-coated particulate substrate.

Embodiment 75 provides the method of any one of Embodiments 69-74, wherein the mixing of the resin composition with a particulate substrate comprises mixing of the resin composition with a particulate substrate to provide a resin-coated particulate substrate, further comprising adding and mixing the resin-coated particulate substrate Embodiment 76 provides the method of any one of Embodiments 69-75, wherein at least one of: a) the mixing of the resin composition with the particulate substrate comprises coating the resin composition on the particulate substrate to give a resin composition-coated particulate substrate; and mixing the resin composition-coated particulate substrate with a fracturing carrier fluid, to give a first particulate slurry; and b) the mixing of the resin composition with the particulate substrate comprises mixing the resin composition, the particulate substrate, and a fracturing carrier fluid, to give a second particulate slurry; wherein contacting the subterranean material downhole with the resin composition comprises contacting the subterranean material downhole with at least one of the first and second particulate slurry.

Embodiment 77 provides the method of Embodiment 76, wherein the contacted subterranean material downhole comprises a fracture.

Embodiment 78 provides the method of any one of Embodiments 76-77, wherein the hardened resin composition comprises a consolidated permeable proppant pack sufficient to at least partially control proppant flowback and wherein the hardened resin composition is sufficient to at least partially mitigate the production of water.

Embodiment 79 provides the method of any one of Embodiments 1-78, wherein the resin composition has a viscosity at standard temperature and pressure of about 0.05 cP to about 1,500 cP.

Embodiment 80 provides the method of any one of Embodiments 1-79, wherein the resin composition has a viscosity at standard temperature and pressure of about 5 cP to about 500 cP.

Embodiment 81 provides the method of any one of Embodiments 1-80, wherein the resin composition downhole during contacting with the subterranean formation has a viscosity of about 0.01 cP to about 1,500 cP.

Embodiment 82 provides the method of any one of Embodiments 1-81, wherein the hardened resin composition has a viscosity downhole of at least about 50 cP.

Embodiment 83 provides the method of any one of Embodiments 1-82, wherein the hardened resin composition has a viscosity downhole of about at least about 100 cP to about 1,000,000,000 cP.

Embodiment 84 provides the method of any one of Embodiments 1-83, further comprising applying a preflush solution to the subterranean formation.

Embodiment 85 provides the method of any one of Embodiments 1-84, wherein the preflush solution comprises an aqueous liquid.

Embodiment 86 provides the method of Embodiment 85, wherein the aqueous liquid in the preflush solution comprises at least one of salt water and brine.

Embodiment 87 provides the method of any one of Embodiments 1-86, wherein the preflush solution comprises a surfactant.

Embodiment 88 provides the method of Embodiment 87, wherein the surfactant in the preflush solution comprises at least one of an ethoxylated nonyl phenol phosphate ester, a cationic surfactant, a non-ionic surfactant, an alkyl phosphonate surfactant, or mixtures thereof.

Embodiment 89 provides the method of any one of Embodiments 1-88, further comprising applying an afterflush fluid to the subterranean formation.

Embodiment 90 provides the method of Embodiment 89, wherein the afterflush fluid comprises at least one of salt water and brine.

Embodiment 91 provides the method of any one of Embodiments 89-90, wherein the afterflush fluid comprises nitrogen gas.

Embodiment 92 provides the method of any one of Embodiments 1-91, further comprising combining the composition with an aqueous or oil-based fluid comprising a drilling fluid, stimulation fluid, fracturing fluid, spotting fluid, clean-up fluid, production fluid, completion fluid, remedial treatment fluid, abandonment fluid, pill, acidizing fluid, cementing fluid, packer fluid, or a combination thereof, to form a mixture, wherein the contacting of the subterranean material and the composition comprises contacting the subterranean material and the mixture.

Embodiment 93 provides the method of Embodiment 92, wherein the cementing fluid comprises Portland cement, pozzolana cement, gypsum cement, high alumina content cement, slag cement, silica cement, or a combination thereof.

Embodiment 94 provides the method of any one of Embodiments 1-93, wherein at least one of prior to, during, and after the contacting of the subterranean material and the composition, the composition is used downhole, at least one of alone and in combination with other materials, as a drilling fluid, stimulation fluid, fracturing fluid, spotting fluid, clean-up fluid, production fluid, completion fluid, remedial treatment fluid, abandonment fluid, pill, acidizing fluid, cementing fluid, packer fluid, or a combination thereof.

Embodiment 95 provides the method of any one of Embodiments 1-94, wherein the composition further comprises water, saline, aqueous base, oil, organic solvent, synthetic fluid oil phase, aqueous solution, alcohol or polyol, cellulose, starch, alkalinity control agent, density control agent, density modifier, emulsifier, dispersant, polymeric stabilizer, crosslinking agent, polyacrylamide, polymer or combination of polymers, antioxidant, heat stabilizer, foam control agent, solvent, diluent, plasticizer, filler or inorganic particle, pigment, dye, precipitating agent, rheology modifier, oil-wetting agent, set retarding additive, surfactant, gas, weight reducing additive, heavy-weight additive, lost circulation material, filtration control additive, dispersant, salt, fiber, thixotropic additive, breaker, crosslinker, gas, rheology modifier, curing accelerator, curing retarder, pH modifier, chelating agent, scale inhibitor, enzyme, resin, water control material, polymer, oxidizer, a marker, Portland cement, pozzolana cement, gypsum cement, high alumina content cement, slag cement, silica cement fly ash, metakaolin, shale, zeolite, a crystalline silica compound, amorphous silica, fibers, a hydratable clay, microspheres, pozzolan lime, or a combination thereof.

Embodiment 96 provides a method of treating a subterranean formation, the method comprising: obtaining or providing a resin composition comprising a hardenable composition comprising a hardenable resin that is about 70 wt % to about 100 wt % of the hardenable composition, wherein the hardenable composition is about 10 wt % to about 90 wt % of the resin composition; a hardening composition comprising a water control hardening agent that is about 40 wt % to about 60 wt % of the hardening composition, wherein the hardening composition is about 10 wt % to about 90 wt % of the resin composition, wherein the water control hardening agent is at least one of a polymer having Structure I

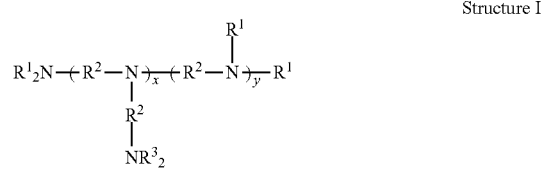

Structure I wherein the polymer of Structure I is a block or random copolymer wherein each repeating unit at each occurrence independently occurs in the orientation shown in Structure I or in an opposite orientation, $R^1$ at each occurrence is independently selected from the group consisting of —H and $C_1$-$C_{10}$ hydrocarbyl, $R^2$ at each occurrence is independently $C_1$-$C_{10}$ hydrocarbylene, $R^3$ at each occurrence is independently selected from the group consisting of $R^1$ and —$R^2$—$NR^3_2$, $0 \leq x \leq 25,000$, $0 \leq y \leq 25,000$, and $2 \leq x+y \leq 25,000$, and a polymer having Structure II Structure II

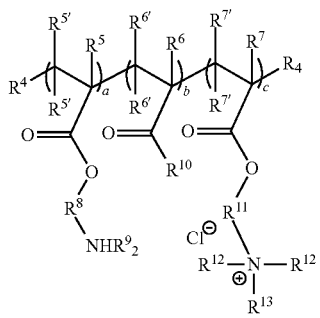

wherein the polymer of Structure II is a block or random copolymer wherein each repeating unit at each occurrence independently occurs in the orientation shown in Structure I or in an opposite orientation, each of $R^4$, $R^5$, $R^{5'}$, $R^6$, $R^{6'}$, $R^7$, and $R^{7'}$ at each occurrence is independently selected from the group consisting of —H and $C_1$-$C_{10}$ hydrocarbyl, each of $R^8$ and $R^{11}$ at each occurrence is independently $C_1$-$C_{10}$ hydrocarbylene, each of $R^9$ and $R^{12}$ at each occurrence is independently selected from the group consisting of —H and $C_1$-$C_{10}$ hydrocarbyl, $R^{10}$ at each occurrence is independently selected from the group consisting of —OH, —O$^-$, and O$^-$CI$^+$ wherein CI$^+$ is a counter-ion, $R^{13}$ at each occurrence is independently selected from the group consisting of —H and $C_1$-$C_{50}$ hydrocarbyl, CI$^-$ is a counter-ion that is optionally present or not present, and a, b, and c are mole fractions, wherein a+b+c=1, $0.01 \leq a \leq 99.98$, $0.01 \leq b \leq 99.98$, and $0.01 \leq c \leq 99.98$; contacting a subterranean material downhole with the resin composition; and reacting the hardenable composition and the hardening composition, to give a hardened resin composition.

Embodiment 97 provides a system comprising: a resin composition comprising a hardenable composition comprising a hardenable resin; and a hardening composition comprising a water control hardening agent; a subterranean material downhole in contact with the resin composition, wherein the hardenable composition and the hardening composition are configured to react to give a hardened resin composition.

Embodiment 98 provides a composition for treatment of a subterranean formation, the composition comprising: a hardenable composition comprising a hardenable resin; a hardening composition comprising a water control hardening agent, wherein the water control hardening agent is at least one of a polymer having Structure I Structure I

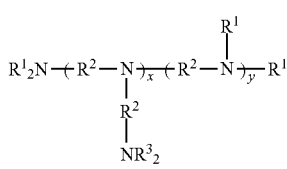

wherein the polymer of Structure I is a block or random copolymer wherein each repeating unit at each occurrence independently occurs in the orientation shown in Structure I or in an opposite orientation, $R^1$ at each occurrence is independently selected from the group consisting of —H and $C_1$-$C_{10}$ hydrocarbyl, $R^2$ at each occurrence is independently $C_1$-$C_{10}$ hydrocarbylene, $R^3$ at each occurrence is independently selected from the group consisting of $R^1$ and —$R^2$—NR$^3_2$, $0 \leq x \leq 25,000$, $0 \leq y \leq 25,000$, and $2 \leq x+y \leq 25,000$, and a polymer having Structure II Structure II

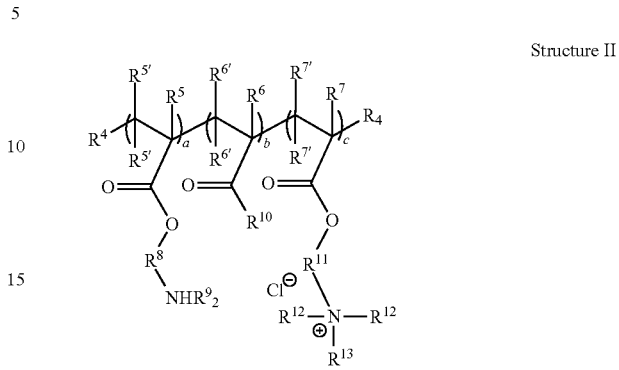

wherein the polymer of Structure II is a block or random copolymer wherein each repeating unit at each occurrence independently occurs in the orientation shown in Structure I or in an opposite orientation, each of $R^4$, $R^5$, $R^{5'}$, $R^6$, $R^{6'}$, $R^7$, and $R^{7'}$ at each occurrence is independently selected from the group consisting of —H and $C_1$-$C_{10}$ hydrocarbyl, each of $R^8$ and $R^{11}$ at each occurrence is independently $C_1$-$C_{10}$ hydrocarbylene, each of $R^9$ and $R^{12}$ at each occurrence is independently selected from the group consisting of —H and $C_1$-$C_{10}$ hydrocarbyl, $R^{10}$ at each occurrence is independently selected from the group consisting of —OH, —O$^-$, and —O$^-$CI$^+$ wherein CI$^+$ is a counter-ion, $R^{13}$ at each occurrence is independently selected from the group consisting of —H and $C_1$-$C_{50}$ hydrocarbyl, CI$^-$ is a counter-ion that is optionally present or not present, and a, b, and c are mole fractions, wherein a+b+c=1, $0.01 \leq a \leq 99.98$, $0.01 \leq b \leq 99.98$, and $0.01 \leq c \leq 99.98$.

Embodiment 99 provides the composition of Embodiment 98, wherein the composition further comprises a downhole fluid.

Embodiment 100 provides the composition of any one of Embodiments 98-99, wherein the composition is a composition for fracturing of a subterranean material.

Embodiment 101 provides a composition for treatment of a subterranean formation, the composition comprising: a hardenable composition comprising a hardenable resin; a hardening composition comprising a water control hardening agent, wherein the water control hardening agent is at least one of a polymer having the structure

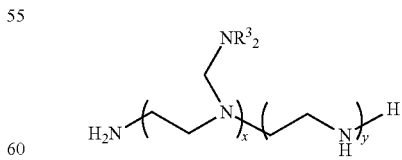

wherein $R^3$ at each occurrence is independently selected from the group consisting of —H and —CH$_2$—CH$_2$—NR$^3_2$, $0 \leq x \leq 2,500$, $0 \leq y \leq 2,500$, $10 \leq x+y \leq 2,500$, and the molecular weight of the polymer is about 300 g/mol to about 200,000 g/mol, and a polymer having the structure

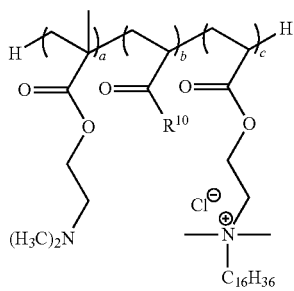

wherein a, b, and c are mole fractions, a is about 0.9, b is about 0.05, c is about 0.05, $R^{10}$ at each occurrence is independently selected from the group consisting of —OH, —O⁻, and —O⁻CI⁺ wherein CI⁺ is a counter-ion, and CI⁻ is a counter-ion that is optionally present or not present; wherein the water control hardening agent polymer is a block or random copolymer, each repeating unit at each occurrence independently occurring in the orientation shown, or in an opposite orientation.

Embodiment 102 provides a method of preparing a composition for treatment of a subterranean formation, the method comprising: forming a composition comprising a hardenable composition comprising a hardenable resin; a hardening composition comprising a water control hardening agent, wherein the water control hardening agent is at least one of a polymer having Structure I

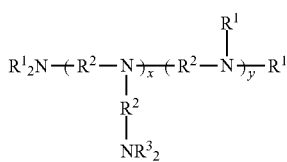

Structure I wherein the polymer of Structure I is a block or random copolymer wherein each repeating unit at each occurrence independently occurs in the orientation shown in Structure I or in an opposite orientation, $R^1$ at each occurrence is independently selected from the group consisting of —H and $C_1$-$C_{10}$ hydrocarbyl, $R^2$ at each occurrence is independently $C_1$-$C_{10}$ hydrocarbylene, $R^3$ at each occurrence is independently selected from the group consisting of $R^1$ and —$R^2$—$NR^3{}_2$, $0 \leq x \leq 25{,}000$, $0 \leq y \leq 25{,}000$, and $2 \leq x+y \leq 25{,}000$, and a polymer having Structure II

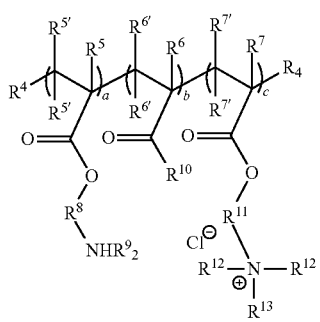

Structure II wherein the polymer of Structure II is a block or random copolymer wherein each repeating unit at each occurrence independently occurs in the orientation shown in Structure I or in an opposite orientation, each of $R^4$, $R^5$, $R^{5'}$, $R^6$, $R^{6'}$, $R^7$, and $R^{7'}$ at each occurrence is independently selected from the group consisting of —H and $C_1$-$C_{10}$ hydrocarbyl, each of $R^8$ and $R^{11}$ at each occurrence is independently $C_1$-$C_{10}$ hydrocarbylene, each of $R^9$ and $R^{12}$ at each occurrence is independently selected from the group consisting of —H and $C_1$-$C_{10}$ hydrocarbyl, $R^{10}$ at each occurrence is independently selected from the group consisting of —OH, —O⁻, and —O⁻CI⁺ wherein CI⁺ is a counter-ion, $R^{13}$ at each occurrence is independently selected from the group consisting of —H and $C_1$-$C_{50}$ hydrocarbyl, CI⁻ is a counter-ion that is optionally present or not present, and a, b, and c are mole fractions, wherein a+b+c=1, $0.01 \leq a \leq 99.98$, $0.01 \leq b \leq 99.98$, and $0.01 \leq c \leq 99.98$.

Embodiment 103 provides the apparatus or method of any one or any combination of Embodiments 1-102 optionally configured such that all elements or options recited are available to use or select from.

What is claimed is:
1. A method of treating a subterranean formation, comprising:
applying a preflush solution to the subterranean formation to remove material preventing a hardenable resin from contacting the subterranean formation;
placing a resin composition in the subterranean formation, the resin composition comprising:
a hardenable composition comprising a hardenable resin; and
a hardening composition comprising a water control hardening agent, wherein the water control hardening agent comprises a first polymer having Structure I:

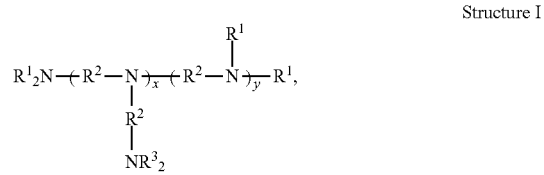

Structure I wherein:
the polymer of Structure I is a block or random copolymer wherein each repeating unit at each occurrence independently occurs in the orientation shown in Structure I or in an opposite orientation,
$R^1$ at each occurrence is independently selected from the group consisting of —H and $C_1$-$C_{10}$ hydrocarbyl,
$R^2$ at each occurrence is independently $C_1$-$C_{10}$ hydrocarbylene,
$R^3$ at each occurrence is independently selected from the group consisting of —H and $C_1$-$C_{10}$ hydrocarbyl, and $2{,}500 \leq x \leq 25{,}000$, $0 < y \leq 25{,}000$, and $2 \leq x+y \leq 25{,}000$;
reacting the hardenable composition and the hardening composition to give a hardened resin composition, wherein the hardened resin composition has water control properties in the subterranean formation selectively flowing hydrocarbons through one or more perforations or fractures, while preventing or reducing the flow of water through the same perforations or fractures via the water control hardening agent in the hardened resin composition.

2. The method of claim 1, wherein reacting of the hardenable composition and the hardening composition occurs at least one of during or after the placing of the resin composition in the subterranean formation.

3. The method of claim 1, wherein the hardenable resin comprises at least one of an epoxide-containing hardenable resin, a polyepoxide hardenable resin, a novolak hardenable resin, a polyester hardenable resin, phenolaldehyde hardenable resin, a urea-aldehyde hardenable resins, a furan hardenable resin, a urethane hardenable resins, a glycidyl ether hardenable resin, or any combination thereof.

4. The method of claim 1, wherein the hardenable resin comprises at least one of bisphenol A diglycidyl ether hardenable resin, butoxymethyl butyl glycidyl ether hardenable resin, bisphenol A-epichlorohydrin hardenable resin, bisphenol F hardenable resin, or any combination thereof.

5. The method of claim 1, wherein the first polymer has the structure:

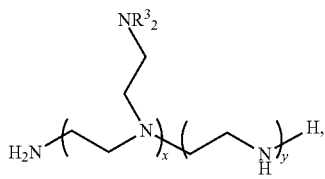

and
wherein $2{,}500 \leq x \leq 10{,}000$ and $0 < y \leq 10{,}000$.

6. The method of claim 1, wherein the water control hardening agent further comprises a second polymer having Structure II:

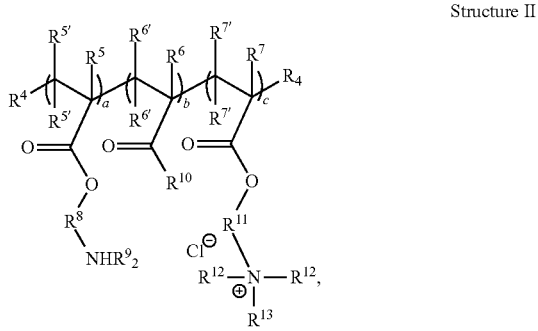

Structure II wherein:
the polymer of Structure II is a block or random copolymer wherein each repeating unit at each occurrence independently occurs in the orientation shown in Structure I or in an opposite orientation,
each of $R^4$, $R^5$, $R^{5'}$, $R^6$, $R^{6'}$, $R^7$, and $R^{7'}$ at each occurrence is independently selected from the group consisting of —H and $C_1$-$C_{10}$ hydrocarbyl,
each of $R^8$ and $R^{11}$ at each occurrence is independently $C_1$-$C_{10}$ hydrocarbylene,
each of $R^9$ and $R^{12}$ at each occurrence is independently selected from the group consisting of —H and $C_1$-$C_{10}$ hydrocarbyl,
$R^{10}$ at each occurrence is independently selected from the group consisting of —OH, —O⁻, and —O⁻CI⁺ wherein CI⁺is a counter-ion,
$R^{13}$ at each occurrence is independently selected from the group consisting of —H and $C_1$-$C_{50}$ hydrocarbyl,
CI⁻is a counter-ion that is optionally present or not present, and
a, b, and c are mole fractions, wherein $a+b+c=1$, $0.01 \leq a \leq 99.98$, $0.01 \leq b \leq 99.98$, and $0.01 \leq c \leq 99.98$.

7. The method of claim 6, wherein the second polymer has the structure:

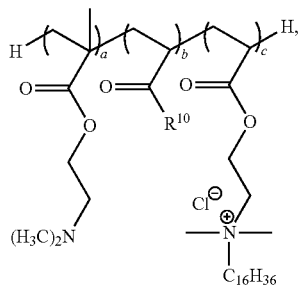

wherein a is about 0.9, b is about 0.05, c is about 0.05, $R^{10}$ at each occurrence is independently selected from the group consisting of —OH, —O⁻, and —O⁻CI⁺ wherein CI⁺is a counter-ion, and CI⁻is a counter-ion that is optionally present or not present.

8. The method of claim 1, wherein the hardenable composition further comprises at least one of an epoxide-containing hardenable resin, a polyepoxide hardenable resin, a novolak hardenable resin, a polyester hardenable resin, a phenolaldehyde hardenable resin, a phenolic-based hardenable resin, a urea-aldehyde hardenable resins, a furan-containing hardenable resin, a urethane hardenable resins, a glycidyl ether hardenable resin, or any combination thereof.

9. The method of claim 1, wherein the resin composition further comprises at least one organic compound comprising at least one of an amine and an amide, wherein the amine is an aromatic amine, an aliphatic amine, a cyclo-aliphatic amine, a polyamine, or a combination thereof, and wherein the amide is a polyamide.

10. The method of claim 1, wherein the resin composition further comprises a silane coupling agent.

11. The method of claim 1, wherein the resin composition further comprises a hydrolyzable ester.

12. The method of claim 1, wherein placing the resin composition in the subterranean formation comprises contacting the resin composition with downhole particulates comprising at least one of fines, sand, gravel, proppant, or any combination thereof 13. The method of claim 1, further comprising, prior to placing the resin composition in the subterranean formation, mixing the resin composition with a particulate substrate to give a resin composition-particulate mixture, wherein placing the resin composition in the subterranean formation comprises placing the resin composition-particulate mixture in the subterranean formation.

14. The method of claim 13, wherein the particulate substrate comprises at least one of sand, bauxite, ceramic materials, glass materials, polymer materials, tetrafluoroethylene materials, nut shell materials, seed shell materials, fruit pit materials, wood, processed wood, hollow glass microspheres, solid glass, or any combination thereof, and composite particulates prepared from a binder and at least one of silica, alumina, fumed silica, carbon black, graphite, mica, titanium dioxide, meta-silicate, calcium silicate, kaolin, talc, zirconia, boron, fly ash, or any combination thereof.

15. The method of claim 1, wherein the hardened resin composition comprises a consolidated permeable proppant pack sufficient to at least partially control proppant flowback and wherein the hardened resin composition is sufficient to at least partially mitigate the production of water.

16. The method of claim 1, further comprising applying an afterflush fluid to the subterranean formation.

17. A method of treating a subterranean formation, the method comprising:

placing a resin composition in the subterranean formation, the resin composition comprising:
a hardenable composition comprising a hardenable resin that is about 70 wt % to about 100 wt % of the hardenable composition, wherein the hardenable composition is about 10 wt % to about 90 wt % of the resin composition;
a hardening composition comprising a water control hardening agent that is about 40 wt % to about 60 wt % of the hardening composition, wherein the hardening composition is about 10 wt % to about 90 wt % of the resin composition, wherein the water control hardening agent comprises:
a first polymer having Structure I:

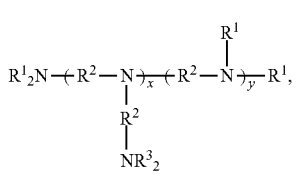

Structure I wherein the polymer of Structure I is a block or random copolymer wherein each repeating unit at each occurrence independently occurs in the orientation shown in Structure I or in an opposite orientation, $R^1$ at each occurrence is independently selected from the group consisting of —H and $C_1$-$C_{10}$ hydrocarbyl, $R^2$ at each occurrence is independently $C_1$-$C_{10}$ hydrocarbylene, $R^3$ at each occurrence is independently selected from the group consisting of —H and $C_1$-$C_{10}$ hydrocarbyl, $2,500 \leq x \leq 25,000$, $0 < y \leq 25,000$, and $2 < x+y \leq 25,000$, and optionally further comprises:

a second polymer having Structure II:

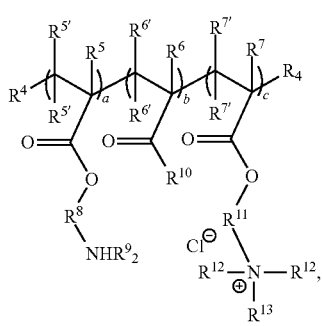

Structure II wherein the second polymer of Structure II is a block or random copolymer wherein each repeating unit at each occurrence independently occurs in the orientation shown in Structure I or in an opposite orientation, each of $R^4$, $R^5$, $R^{5'}$, $R^6$, $R^{6'}$, $R^7$, and $R^{7'}$ at each occurrence is independently selected from the group consisting of —H and $C_1$-$C_{10}$ hydrocarbyl, each of $R^8$ and $R^{11}$ at each occurrence is independently $C_1$-$C_{10}$ hydrocarbylene, each of $R^9$ and $R^{12}$ at each occurrence is independently selected from the group consisting of —H and $C_1$-$C_{10}$ hydrocarbyl, $R^{10}$ at each occurrence is independently selected from the group consisting of —OH, —O$^-$, and —O$^-$CI$^+$ wherein CI$^+$30 is a counter-ion, $R^{13}$ at each occurrence is independently selected from the group consisting of —H and $C_1$-$C_{50}$ hydrocarbyl, CI$^-$ is a counter-ion that is optionally present or not present, and a, b, and c are mole fractions, wherein a+b+c=1, $0.01 \leq a \leq 99.98$, $0.01 < b \leq 99.98$, and $0.01 \leq c \leq 99.98$; and reacting the hardenable composition and the hardening composition, to give a hardened resin composition.

18. A system comprising:
a resin composition comprising:
a hardenable composition comprising a hardenable resin; and
a hardening composition comprising a water control hardening agent; the water control hardening agent is a polymer having Structure I:

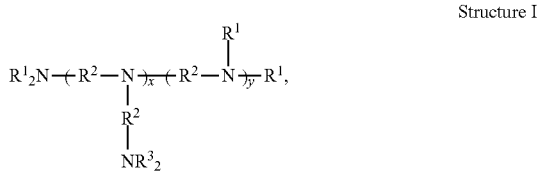

Structure I wherein:
the polymer of Structure I is a block or random copolymer wherein each repeating unit at each occurrence independently occurs in the orientation shown in Structure I or in an opposite orientation, $R^1$ at each occurrence is independently selected from the group consisting of —H and $C_1$-$C_{10}$ hydrocarbyl, $R^2$ at each occurrence is independently $C_1$-$C_{10}$ hydrocarbylene, $R^3$ at each occurrence is independently selected from the group consisting of —H and $C_1$-$C_{10}$ hydrocarbyl, and $2,500 \leq x \leq 10,000$, $0 < y \leq 10,000$, and $2 < x+y \leq 10,000$; and a subterranean formation in contact with the resin composition, wherein the hardenable composition and the hardening composition are configured to react to give a hardened resin composition.

* * * * *